(12) United States Patent
Sheasby et al.

(10) Patent No.: US 10,572,487 B1
(45) Date of Patent: Feb. 25, 2020

(54) PERIODIC DATABASE SEARCH MANAGER FOR MULTIPLE DATA SOURCES

(71) Applicant: Palantir Technologies Inc., Palo Alto, CA (US)

(72) Inventors: Glenn Sheasby, London (GB); John Boreiko, London (GB); Aakash Goenka, London (GB); Michael Glazer, San Jose, CA (US); Spencer Tank, New York, NY (US); Ezra Spiro, New York, NY (US); Juan Ricafort, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 340 days.

(21) Appl. No.: 15/406,195

(22) Filed: Jan. 13, 2017

Related U.S. Application Data

(63) Continuation of application No. 15/152,017, filed on May 11, 2016, now Pat. No. 9,547,693.

(60) Provisional application No. 62/249,088, filed on Oct. 30, 2015, provisional application No. 62/330,465, filed on May 2, 2016.

(51) Int. Cl.
  *G06F 16/2455* (2019.01)
  *G06F 16/23* (2019.01)
  *G06F 16/2453* (2019.01)

(52) U.S. Cl.
  CPC .... *G06F 16/24566* (2019.01); *G06F 16/2358* (2019.01); *G06F 16/24539* (2019.01)

(58) Field of Classification Search
  CPC ......... G06F 16/24566; G06F 16/24539; G06F 16/2358

USPC ........................................................ 707/768
See application file for complete search history.

(56) References Cited

U.S. PATENT DOCUMENTS

| | | | |
|---|---|---|---|
| 5,109,399 | A | 4/1992 | Thompson |
| 5,329,108 | A | 7/1994 | Lamoure |
| 5,632,009 | A | 5/1997 | Rao et al. |

(Continued)

FOREIGN PATENT DOCUMENTS

| | | |
|---|---|---|
| AU | 2014206155 | 12/2015 |
| AU | 2014250678 | 2/2016 |

(Continued)

OTHER PUBLICATIONS

US 8,712,906 B1, 04/2014, Sprague et al. (withdrawn)

(Continued)

*Primary Examiner* — Robert Stevens
(74) *Attorney, Agent, or Firm* — Knobbe, Martens, Olson & Bear, LLP

(57) ABSTRACT

Systems and techniques for searching multiple data sources are described herein. Users may specify searches of multiple data sources to occur on a periodic basis. The searches may be configured to search time or date ranges that have not previously been searched. A user may select the data sources of interest and specify search terms, review and edit previously created searches, and review results of searches. The system automatically performs the specified searches, and notifies the user and/or a team of the user each time new results are found. The system may efficiently search the data sources by storing previous search results and comparing the previous results to current search results to identify new search results.

18 Claims, 19 Drawing Sheets

(56) References Cited

U.S. PATENT DOCUMENTS

| | | |
|---|---|---|
| 5,670,987 A | 9/1997 | Doi et al. |
| 5,724,575 A | 3/1998 | Hoover et al. |
| 5,781,704 A | 7/1998 | Rossmo |
| 5,798,769 A | 8/1998 | Chiu et al. |
| 5,845,300 A | 12/1998 | Comer |
| 5,872,973 A | 2/1999 | Mitchell et al. |
| 5,897,636 A | 4/1999 | Kaeser |
| 6,003,040 A | 12/1999 | Mital et al. |
| 6,057,757 A | 5/2000 | Arrowsmith et al. |
| 6,073,129 A | 6/2000 | Levine et al. |
| 6,091,956 A | 7/2000 | Hollenberg |
| 6,094,653 A | 7/2000 | Li et al. |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 | 4/2002 | Ball et al. |
| 6,369,835 B1 | 4/2002 | Lin |
| 6,374,251 B1 | 4/2002 | Fayyad et al. |
| 6,418,438 B1 | 7/2002 | Campbell |
| 6,430,305 B1 | 8/2002 | Decker |
| 6,456,997 B1 | 9/2002 | Shukla |
| 6,510,504 B2 | 1/2003 | Satyanarayana |
| 6,549,752 B2 | 4/2003 | Tsukamoto |
| 6,549,944 B1 | 4/2003 | Weinberg et al. |
| 6,560,620 B1 | 5/2003 | Ching |
| 6,567,936 B1 | 5/2003 | Yang et al. |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,906,717 B2 | 6/2005 | Couckuyt et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,111,231 B1 | 9/2006 | Huck et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,194,680 B1 | 3/2007 | Roy et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,318,054 B2 | 1/2008 | Nomura et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,392,249 B1 | 6/2008 | Harris et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,761,407 B1 | 7/2010 | Stern |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,814,102 B2 | 10/2010 | Miller et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 7,979,457 B1 | 7/2011 | Garman |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,095,582 B2 | 1/2012 | Cramer |
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,250,474 B2 | 8/2012 | Peters et al. |
| 8,266,168 B2 | 9/2012 | Bayliss |

(56) References Cited

U.S. PATENT DOCUMENTS

| | | |
|---|---|---|
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,375,141 B2 * | 2/2013 | Rowstron ............ G06F 16/2453 709/238 |
| 8,392,394 B1 | 3/2013 | Kumar et al. |
| 8,397,171 B2 | 3/2013 | Klassen et al. |
| 8,412,707 B1 | 4/2013 | Mianji |
| 8,423,909 B2 | 4/2013 | Zabielski |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,620,641 B2 | 12/2013 | Farnsworth et al. |
| 8,620,934 B2 | 12/2013 | Fong et al. |
| 8,639,757 B1 | 1/2014 | Zang et al. |
| 8,646,080 B2 | 2/2014 | Williamson et al. |
| 8,656,478 B1 | 2/2014 | Forristal |
| 8,676,857 B1 | 3/2014 | Adams et al. |
| 8,682,812 B1 | 3/2014 | Ranjan |
| 8,688,573 B1 | 4/2014 | Ruknoic et al. |
| 8,689,108 B1 | 4/2014 | Duffield et al. |
| 8,700,643 B1 | 4/2014 | Gossweiler |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,898,184 B1 | 11/2014 | Garman |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,331 B2 | 1/2015 | McGrew et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,135,233 B2 | 9/2015 | Fan et al. |
| 9,135,658 B2 | 9/2015 | Sprague et al. |
| 9,146,954 B1 | 9/2015 | Boe et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,208,159 B2 | 12/2015 | Stowe et al. |
| 9,229,952 B1 | 1/2016 | Meacham et al. |
| 9,230,280 B1 | 1/2016 | Maag et al. |
| 9,256,664 B2 | 2/2016 | Chakerian et al. |
| 9,280,532 B2 | 3/2016 | Cicerone |
| 9,344,447 B2 | 5/2016 | Cohen et al. |
| 9,348,920 B1 | 5/2016 | Kesin |
| 9,367,872 B1 | 6/2016 | Visbal et al. |
| 9,535,974 B1 | 1/2017 | Kesin et al. |
| 9,547,693 B1 | 1/2017 | Sheasby et al. |
| 9,645,727 B2 | 5/2017 | Devarajan et al. |
| 9,817,563 B1 | 11/2017 | Stokes et al. |
| 9,898,528 B2 | 2/2018 | Kesin |
| 10,180,929 B1 | 1/2019 | Kesin et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0013781 A1 | 1/2002 | Petersen et al. |
| 2002/0033848 A1 | 3/2002 | Sciammarella et al. |
| 2002/0065708 A1 | 5/2002 | Senay et al. |
| 2002/0083039 A1 | 6/2002 | Ferrari |
| 2002/0091694 A1 | 7/2002 | Hrle et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0169759 A1 | 11/2002 | Kraft et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0036848 A1 | 2/2003 | Sheha et al. |
| 2003/0039948 A1 | 2/2003 | Donahue |
| 2003/0055830 A1 | 3/2003 | Gutierrez-Rivas et al. |
| 2003/0074368 A1 | 4/2003 | Schuetze et al. |
| 2003/0097330 A1 | 5/2003 | Hillmer et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0154044 A1 | 8/2003 | Lundstedt et al. |
| 2003/0163352 A1 | 8/2003 | Surpin et al. |
| 2003/0172014 A1 | 9/2003 | Quackenbush et al. |
| 2003/0200217 A1 | 10/2003 | Ackerman |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |

(56) References Cited

U.S. PATENT DOCUMENTS

| | | |
|---|---|---|
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0153418 A1 | 8/2004 | Hanweck |
| 2004/0160309 A1 | 8/2004 | Stilp |
| 2004/0163039 A1 | 8/2004 | McPherson et al. |
| 2004/0181543 A1 | 9/2004 | Wu et al. |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0097441 A1 | 5/2005 | Herbach et al. |
| 2005/0108063 A1 | 5/2005 | Madill et al. |
| 2005/0108231 A1 | 5/2005 | Findleton et al. |
| 2005/0114763 A1 | 5/2005 | Nonomura et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129746 A1 | 6/2006 | Porter |
| 2006/0136402 A1 | 6/2006 | Lee et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0106582 A1 | 5/2007 | Baker et al. |
| 2007/0130206 A1 | 6/2007 | Zhou et al. |
| 2007/0143253 A1 | 6/2007 | Kostamaa et al. |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0271317 A1 | 11/2007 | Carmel |
| 2007/0284433 A1 | 12/2007 | Domenica et al. |
| 2007/0294200 A1 | 12/2007 | Au |
| 2007/0294643 A1 | 12/2007 | Kyle |
| 2008/0015970 A1 | 1/2008 | Brookfield et al. |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0189408 A1 | 2/2008 | Cancel et al. |
| 2008/0071731 A1 | 3/2008 | Ma et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104060 A1 | 5/2008 | Abhyankar et al. |
| 2008/0104149 A1 | 5/2008 | Vishniac et al. |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Worley et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |
| 2008/0270391 A1 | 10/2008 | Newbold et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301378 A1 | 12/2008 | Carrie |

(56) References Cited

U.S. PATENT DOCUMENTS

| | | |
|---|---|---|
| 2008/0301643 A1 | 12/2008 | Appleton et al. |
| 2008/0313132 A1 | 12/2008 | Hao et al. |
| 2008/0319991 A1* | 12/2008 | Ross .................... G06Q 30/02 |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0024589 A1 | 1/2009 | Sood et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0037417 A1 | 2/2009 | Shankar et al. |
| 2009/0044279 A1 | 2/2009 | Crawford et al. |
| 2009/0055251 A1 | 2/2009 | Shah et al. |
| 2009/0070200 A1 | 3/2009 | August |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0106178 A1 | 4/2009 | Chu |
| 2009/0106308 A1 | 4/2009 | Killian et al. |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271359 A1 | 10/2009 | Bayliss |
| 2009/0271435 A1 | 10/2009 | Yako et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0300589 A1 | 12/2009 | Watters et al. |
| 2009/0307049 A1 | 12/2009 | Elliott et al. |
| 2009/0313223 A1 | 12/2009 | Rantanen |
| 2009/0313311 A1 | 12/2009 | Hoffmann et al. |
| 2009/0313463 A1 | 12/2009 | Pang et al. |
| 2009/0318775 A1 | 12/2009 | Michelson et al. |
| 2009/0319418 A1 | 12/2009 | Herz |
| 2009/0319891 A1 | 12/2009 | MacKinlay |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0036831 A1 | 2/2010 | Vemuri et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076939 A1 | 3/2010 | Iwaki et al. |
| 2010/0077481 A1 | 3/2010 | Polyakov et al. |
| 2010/0077483 A1 | 3/2010 | Stolfo et al. |
| 2010/0082541 A1 | 4/2010 | Kottomtharayil |
| 2010/0088158 A1 | 4/2010 | Pollack |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0106752 A1 | 4/2010 | Eckardt et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0131502 A1 | 5/2010 | Fordham |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0161735 A1 | 6/2010 | Sharma |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0228812 A1 | 9/2010 | Uomini |
| 2010/0235606 A1 | 9/2010 | Oreland et al. |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029498 A1 | 2/2011 | Ferguson et al. |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0055140 A1 | 3/2011 | Roychowdhury |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0161137 A1 | 6/2011 | Ubalde et al. |
| 2011/0167054 A1 | 7/2011 | Bailey et al. |
| 2011/0167105 A1 | 7/2011 | Ramakrishnan et al. |

(56) References Cited

U.S. PATENT DOCUMENTS

| | | |
|---|---|---|
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0173619 A1 | 7/2011 | Fish |
| 2011/0178842 A1 | 7/2011 | Rane et al. |
| 2011/0181598 A1 | 7/2011 | O'Neall et al. |
| 2011/0184813 A1 | 7/2011 | Barne et al. |
| 2011/0185316 A1 | 7/2011 | Reid et al. |
| 2011/0196737 A1 | 8/2011 | Vadlamani et al. |
| 2011/0202500 A1 | 8/2011 | Warn et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowtiz |
| 2011/0258158 A1 | 10/2011 | Resende et al. |
| 2011/0258190 A1 | 10/2011 | Chen et al. |
| 2011/0258242 A1 | 10/2011 | Eidson et al. |
| 2011/0270604 A1 | 11/2011 | Qi et al. |
| 2011/0270705 A1 | 11/2011 | Parker |
| 2011/0270812 A1 | 11/2011 | Ruby |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0314546 A1 | 12/2011 | Aziz et al. |
| 2012/0004904 A1 | 1/2012 | Shin et al. |
| 2012/0005581 A1 | 1/2012 | Turner et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084135 A1 | 4/2012 | Nissan et al. |
| 2012/0084287 A1 | 4/2012 | Lakshminarayan et al. |
| 2012/0084866 A1 | 4/2012 | Stolfo |
| 2012/0106801 A1 | 5/2012 | Jackson |
| 2012/0116828 A1 | 5/2012 | Shannon |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131107 A1 | 5/2012 | Yost |
| 2012/0131512 A1 | 5/2012 | Takeuchi et al. |
| 2012/0136804 A1 | 5/2012 | Lucia |
| 2012/0137235 A1 | 5/2012 | TS et al. |
| 2012/0144335 A1 | 6/2012 | Abeln et al. |
| 2012/0150791 A1 | 6/2012 | Willson |
| 2012/0158626 A1 | 6/2012 | Zhu et al. |
| 2012/0159307 A1 | 6/2012 | Chung et al. |
| 2012/0159312 A1 | 6/2012 | Mital et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203584 A1 | 8/2012 | Mishor et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0233145 A1* | 9/2012 | Howes ............... G06F 16/951 707/706 |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0278273 A1 | 11/2012 | Fang |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0036346 A1 | 2/2013 | Cicerone |
| 2013/0046635 A1 | 2/2013 | Grigg et al. |
| 2013/0046783 A1* | 2/2013 | Zhang ............... G06F 16/24568 707/770 |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0150004 A1 | 6/2013 | Rosen |
| 2013/0151148 A1 | 6/2013 | Parundekar et al. |

(56) References Cited

U.S. PATENT DOCUMENTS

| | | |
|---|---|---|
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0159340 A1 | 6/2013 | Blanco et al. |
| 2013/0160120 A1 | 6/2013 | Malaviya et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2013/0318594 A1 | 11/2013 | Hoy et al. |
| 2013/0318604 A1 | 11/2013 | Coates et al. |
| 2013/0332862 A1 | 12/2013 | Mirra et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0012796 A1 | 1/2014 | Petersen et al. |
| 2014/0019119 A1 | 1/2014 | Liu et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081652 A1 | 3/2014 | Klindworth |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0195887 A1 | 7/2014 | Ellis et al. |
| 2014/0195916 A1 | 7/2014 | Kwan et al. |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0280293 A1* | 9/2014 | Scanlon ............ G06F 16/24552 707/769 |
| 2014/0283067 A1 | 9/2014 | Call et al. |
| 2014/0310266 A1 | 10/2014 | Greenfield |
| 2014/0310282 A1 | 10/2014 | Sprague et al. |
| 2014/0316911 A1 | 10/2014 | Gross |
| 2014/0317104 A1 | 10/2014 | Isaacs et al. |
| 2014/0324876 A1 | 10/2014 | Konik et al. |
| 2014/0330845 A1 | 11/2014 | Feldschuh |
| 2014/0331119 A1 | 11/2014 | Dixon et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344231 A1 | 11/2014 | Stowe et al. |
| 2014/0344256 A1* | 11/2014 | Bitincka ............... G06F 16/951 707/722 |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2014/0379755 A1 | 12/2014 | Kuriakose et al. |
| 2014/0379812 A1 | 12/2014 | Paul et al. |
| 2015/0019394 A1 | 1/2015 | Unser et al. |
| 2015/0039886 A1 | 2/2015 | Kahol et al. |
| 2015/0046870 A1 | 2/2015 | Goldenberg et al. |
| 2015/0067533 A1 | 3/2015 | Volach |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106347 A1 | 4/2015 | McGrew et al. |
| 2015/0106379 A1 | 4/2015 | Elliot et al. |
| 2015/0112956 A1 | 4/2015 | Chang et al. |
| 2015/0112998 A1 | 4/2015 | Shankar et al. |
| 2015/0134666 A1 | 5/2015 | Gattiker et al. |
| 2015/0135113 A1 | 5/2015 | Sekharan |
| 2015/0135256 A1 | 5/2015 | Hoy et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0199324 A1 | 7/2015 | Nishioka |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0235334 A1 | 8/2015 | Wang et al. |
| 2015/0242397 A1 | 8/2015 | Zhuang |
| 2015/0261817 A1 | 9/2015 | Harris et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0341467 A1 | 11/2015 | Lim et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian et al. |

(56) References Cited

U.S. PATENT DOCUMENTS

| | | | |
|---|---|---|---|
| 2016/0004764 A1 | 1/2016 | Chakerian et al. | |
| 2016/0034470 A1 | 2/2016 | Sprague et al. | |
| 2016/0034545 A1 | 2/2016 | Shankar et al. | |
| 2016/0034555 A1 | 2/2016 | Rahut et al. | |
| 2016/0048937 A1 | 2/2016 | Mathura et al. | |
| 2016/0062555 A1 | 3/2016 | Ward et al. | |
| 2016/0098173 A1 | 4/2016 | Slawinski et al. | |
| 2016/0098485 A1 | 4/2016 | Burke et al. | |
| 2016/0147730 A1 | 5/2016 | Cicerone | |
| 2016/0147769 A1 | 5/2016 | Murphey et al. | |
| 2016/0180451 A1 | 6/2016 | Visbal et al. | |
| 2016/0180557 A1 | 6/2016 | Yousaf et al. | |
| 2016/0210195 A1 | 7/2016 | Sinha | |
| 2016/0306965 A1* | 10/2016 | Iyer | G06F 21/552 |
| 2017/0046349 A1 | 2/2017 | Shankar et al. | |
| 2018/0052597 A1 | 2/2018 | Stokes et al. | |
| 2018/0173792 A1 | 6/2018 | Kesin | |
| 2019/0114309 A1 | 4/2019 | Kesin et al. | |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 0652513 | 5/1995 |
| EP | 1191463 | 3/2002 |
| EP | 1672527 | 6/2006 |
| EP | 2487610 | 8/2012 |
| EP | 2551799 | 1/2013 |
| EP | 2555126 | 2/2013 |
| EP | 2555153 | 2/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963577 | 1/2016 |
| EP | 2963595 | 1/2016 |
| EP | 2985729 | 2/2016 |
| EP | 3018879 | 5/2016 |
| EP | 3037991 | 6/2016 |
| EP | 3037992 | 6/2016 |
| EP | 3038002 | 6/2016 |
| EP | 3038046 | 6/2016 |
| GB | 2513247 | 10/2014 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 02/065353 | 8/2002 |
| WO | WO 2005/104736 | 11/2005 |
| WO | WO 2005/116851 | 12/2005 |
| WO | WO 2008/011728 | 1/2008 |
| WO | WO 2008/064207 | 5/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2012/025915 | 3/2012 |
| WO | WO 2013/010157 | 1/2013 |
| WO | WO 2013/102892 | 7/2013 |
| WO | WO 2013/126281 | 8/2013 |

OTHER PUBLICATIONS

US 8,725,631 B1, 05/2014, Sprague et al. (withdrawn)
Liu, Ling, et al., "Differential Evaluation of Continual Queries", ICDCS 1996, Hong Kong, May 27-30, 1996, pp. 458-465.*
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Alur et al., "Chapter 2: IBM InfoSphere DataStage Stages," IBM InfoSphere DataStage Data Flow and Job Design, Jul. 1, 2008, pp. 35-137.
Anjewierden et al., "Automatic Indexing of PDF Documents with Ontologies", Social Science Informatics, University of Amsterdam, The Netherlands, Jun. 11, 2011, pp. 8.
Baker et al., "The Development of a Common Enumeration of Vulnerabilities and Exposures," Presented at the Second International Workshop on Recent Advances in Intrusion Detection, Sep. 7-9, 1999, pp. 35.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Jelen, Bill, "Excel 2013 in Depth, Video Enhanced Edition," Jan. 25, 2013.
Map Builder, "Rapid Mashup Development Tool for Google and Yahoo Maps!" http://web.archive.org/web/20090626224734/http://www.mapbuilder.net/ printed Jul. 20, 2012 in 2 pages.
Palantir Technolgies, "Palantir Labs—Timeline," Oct. 1, 2010, retrieved from the internet https://www.youtube.com/watch?v=JCgDW5bru9M retrieved on Aug. 19, 2015.
Quest, "Toad for Oracle 11.6—Guide to Using Toad," Sep. 24, 2012, pp. 1-162.
Wikipedia, "Mobile Web," Jan. 23, 2015, retrieved from the internet on Mar. 15, 2016 https://en.wikipedia.org/w/index.php?title=Mobile_Web&oldid=643800164.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Notice of Acceptance for Australian Patent Application No. 2014250678 dated Oct. 7, 2015.
Notice of Allowance for U.S. Appl. No. 12/556,318 dated Apr. 11, 2016.
Notice of Allowance for U.S. Appl. No. 12/556,318 dated Nov. 2, 2015.
Notice of Allowance for U.S. Appl. No. 13/196,788 dated Dec. 18, 2015.
Notice of Allowance for U.S. Appl. No. 13/247,987 dated Mar. 17, 2016.
Notice of Allowance for U.S. Appl. No. 13/826,228 dated Mar. 27, 2015.
Notice of Allowance for U.S. Appl. No. 14/192,767 dated Apr. 20, 2015.
Notice of Allowance for U.S. Appl. No. 14/319,161 dated May 4, 2015.
Notice of Allowance for U.S. Appl. No. 14/319,765 dated Nov. 25, 2016.

(56) References Cited

OTHER PUBLICATIONS

Notice of Allowance for U.S. Appl. No. 14/326,738 dated Nov. 18, 2015.
Notice of Allowance for U.S. Appl. No. 14/473,860 dated Feb. 27, 2015.
Notice of Allowance for U.S. Appl. No. 14/552,336 dated Nov. 3, 2015.
Notice of Allowance for U.S. Appl. No. 14/581,920 dated Sep. 2, 2016.
Notice of Allowance for U.S. Appl. No. 14/734,772 dated Apr. 27, 2016.
Notice of Allowance for U.S. Appl. No. 14/746,671 dated Jan. 21, 2016.
Notice of Allowance for U.S. Appl. No. 14/815,459 dated Sep. 23, 2016.
Notice of Allowance for U.S. Appl. No. 14/849,454 dated May 25, 2016.
Notice of Allowance for U.S. Appl. No. 14/923,364 dated May 6, 2016.
Notice of Allowance for U.S. Appl. No. 14/948,009 dated May 6, 2016.
Official Communication for European Patent Application No. 14187996.5 dated Feb. 19, 2016.
Official Communication for European Patent Application No. 14189344.6 dated Feb. 29, 2016.
Official Communication for European Patent Application No. 14197938.5 dated Apr. 28, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15201881.8 dated May 23, 2016.
Official Communication for European Patent Application No. 15201924.6 dated Apr. 25, 2016.
Official Communication for European Patent Application No. 16152984.7 dated Mar. 24, 2016.
Official Communication for Netherlands Patent Application No. 2012437 dated Sep. 18, 2015.
Official Communication for New Zealand Patent Application No. 622513 dated Apr. 3, 2014.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 13/827,491 dated Oct. 9, 2015.
Official Communication for U.S. Appl. No. 14/141,252 dated Oct. 8, 2015.
Official Communication for U.S. Appl. No. 14/196,814 dated May 5, 2015.
Official Communication for U.S. Appl. No. 14/225,084 dated Feb. 26, 2016.
Official Communication for U.S. Appl. No. 14/306,138 dated Mar. 17, 2016.
Official Communication for U.S. Appl. No. 14/306,147 dated Jun. 3, 2016.
Official Communication for U.S. Appl. No. 14/306,154 dated Feb. 1, 2016.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/319,765 dated Feb. 1, 2016.
Official Communication for U.S. Appl. No. 14/463,615 dated Sep. 10, 2015.
Official Communication for U.S. Appl. No. 14/483,527 dated Oct. 28, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Aug. 24, 2015.
Official Communication for U.S. Appl. No. 14/578,389 dated Oct. 21, 2015.
Official Communication for U.S. Appl. No. 14/578,389 dated Apr. 22, 2016.
Official Communication for U.S. Appl. No. 14/580,218 dated Jun. 7, 2016.
Official Communication for U.S. Appl. No. 14/581,920 dated Sep. 2, 2016.
Official Communication for U.S. Appl. No. 14/631,633 dated Sep. 10, 2015.
Official Communication for U.S. Appl. No. 14/645,304 dated Jan. 25, 2016.
Official Communication for U.S. Appl. No. 14/676,621 dated Oct. 29, 2015.
Official Communication for U.S. Appl. No. 14/726,211 dated Apr. 5, 2016.
Official Communication for U.S. Appl. No. 14/734,772 dated Oct. 30, 2015.
Official Communication for U.S. Appl. No. 14/746,671 dated Nov. 12, 2015.
Official Communication for U.S. Appl. No. 14/800,447 dated Mar. 3, 2016.
Official Communication for U.S. Appl. No. 14/841,338 dated Feb. 18, 2016.
Official Communication for U.S. Appl. No. 14/842,734 dated Nov. 19, 2015.
Official Communication for U.S. Appl. No. 14/874,690 dated Jun. 1, 2016.
Official Communication for U.S. Appl. No. 14/874,690 dated Dec. 21, 2015.
Official Communication for U.S. Appl. No. 14/948,009 dated Feb. 25, 2016.
Official Communication for U.S. Appl. No. 14/961,830 dated May 20, 2016.
Official Communication for U.S. Appl. No. 14/996,179 dated May 20, 2016.
Official Communication for U.S. Appl. No. 15/159,622 dated Feb. 24, 2017.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.

(56) References Cited

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"The FASTA Program Package," fasta-36.3.4, Mar. 25, 2011, pp. 29.

"Using Whois Based Geolocation and Google Maps API for Support Cybercrime Investigations," http://wseas.us/e-library/conferences/2013/Dubrovnik/TELECIRC/TELECIRC-32.pdf.

"Apache HBase", http://hbase.apache.org/ printed Sep. 14, 2011 in 1 page.

"The Apache Cassandra Project", http://cassandra.apache.org/ printed Sep. 14, 2011 in 3 pages.

Acklen, Laura, "Absolute Beginner's Guide to Microsoft Word 2003," Dec. 24, 2003, pp. 15-18, 34-41, 308-316.

Alfred, Rayner "Summarizing Relational Data Using Semi-Supervised Genetic Algorithm-Based Clustering Techniques", Journal of Computer Science, 2010, vol. 6, No. 7, pp. 775-784.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Anonymous, "BackTult _ JD Edwards One World Version Control System," printed Jul. 23, 2007 in 1 page.

Antoshenkov, Gennady, "Dictionary-Based Order-Preserving String Compression", The VLDB Journal, pp. 26-39, 1997.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Bhosale, Safal V., "Holy Grail of Outlier Detection Technique: A Macro Level Take on the State of the Art," International Journal of Computer Science & Information Technology, Aug. 1, 2014, retrieved from http://www.ijcsit.com/docs/Volume5/vol5issue04/ijcsit20140504226.pdf retrieved May 3, 2016.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chang et al., "A new multi-search engine for querying data through an Internet search service on CORBA", Computer Networks, vol. 34, Issue 3, Sep. 2000, pp. 467-480.

Chang et al., "Bigtable: A Distributed Storage System for Structured Data", Google, Inc., OSDI'06: Seventh Symposium on Operating System Design and Implementation, Seattle, WA, Nov. 2006.

Chaudhuri et al., "An Overview of Business Intelligence Technology," Communications of the ACM, Aug. 2011, vol. 54, No. 8.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Cohn, et al., "Semi-supervised clustering with user feedback," Constrained Clustering: Advances in Algorithms, Theory, and Applications 4.1 (2003): 17-32.

Conner, Nancy, "Google Apps: The Missing Manual," May 1, 2008, pp. 15.

Countly Mobile Analytics, <http://count.ly/> Printed Jul. 18, 2013 in 9 pages.

Definition "Identify", downloaded Jan. 22, 2015, 1 page.

Definition "Overlay", downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Devanbu et al., "Authentic Third-party Data Publication", http://www.cs.ucdavis.edu/~devanbu/authdbpub.pdf, p. 19, 2000.

Distimo—App Analytics, <http://www.distimo.com/app-analytics> Printed Jul. 18, 2013 in 5 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.

Elmasri et al., "Fundamentals of Database Systems", Fourth Edition, pp. 455-491, 2004.

Flurry Analytics, <http://www.flurry.com/> Printed Jul. 18, 2013 in 14 pages.

GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.

Golmohammadi et al., "Data Mining Applications for Fraud Detection in Securities Market," Intelligence and Security Informatics Conference (EISIC), 2012 European, IEEE, Aug. 22, 2012, pp. 107-114.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Goswami, Gautam, "Quite Writly Said!," One Brick at a Time, Aug. 21, 2005, pp. 7.

Griffith, Daniel A., "A Generalized Huff Model," Geographical Analysis, Apr. 1982, vol. 14, No. 2, pp. 135-144.

Gu et al., "Record Linkage: Current Practice and Future Directions," Jan. 15, 2004, pp. 32.

Gu et al., "BotMiner: Clustering Analysis of Network Traffice for Protocol-and-Structure-Independent Botnet Detection," Usenix Security Symposium, 2008, 17 pages.

Hansen et al., "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hibbert et al., "Prediction of Shopping Behavior Using a Huff Model Within a GIS Framework," Healthy Eating in Context, Mar. 18, 2011, pp. 16.

Hodge et al., "A Survey of Outlier Detection Methodologies," Artificial Intelligence Review, vol. 22, No. 2, Oct. 1, 2004.

(56) References Cited

OTHER PUBLICATIONS

Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontology Management System (Design)", Information Societies Technology Programme, Jan. 10, 2002, pp. 1-27.
Kontagent Mobile Analytics, <http://www.kontagent.com/> Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Li et al., "Identifying the Signs of Fraudulent Accounts using Data Mining Techniques," Computers in Human Behavior, vol. 28, No. 3, Jan. 16, 2012.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Mixpanel—Mobile Analytics, <https://mixpanel.com/> Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3, Feb. 1, 2011.
Niepert et al., "A Dynamic Ontology for a Dynamic Reference Work", Joint Conference on Digital Libraries, Jun. 17-22, 2007, Vancouver, British Columbia, Canada, pp. 1-10.
Nierman, "Evaluating Structural Similarity in XML Documents", 6 pages, 2002.
Nolan et al., "MCARTA: A Malicious Code Automated Run-Time Analysis Framework," Homeland Security (HST) 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), <http://www.openwebanalytics.com/> Printed Jul. 19, 2013 in 5 pages.
Palmas et al., "An Edge-Bunding Layout for Interactive Parallel Coordinates" 2014 IEEE Pacific Visualization Symposium, pp. 57-64.
Peng et al., "Large-scale Incremental Processing Using Distributed Transactions and Notifications", Proceedings of the 9th Usenix Symposium on Operating Systems Design and Implementation, Usenix, p. 14, 2010.
Perdisci et al., "Behavioral Clustering of HTTP-Based Malware and Signature Generation Using Malicious Network Traces," Usenix, Mar. 18, 2010, pp. 1-14.
Piwik—Free Web Analytics Software. <http://piwik.org/> Printed Jul. 19, 2013 in18 pages.
Quartert FS "Managing Business Performance and Detecting Outliers in Financial Services," Oct. 16, 2014, retrieved from https://quartetfs.com/images/pdf/white-papers/Quartet_FS_White_Paper_-_ActivePivot_Sentinel.pdf retrieved on May 3, 2016.
Rouse, Margaret, "OLAP Cube," <http://searchdatamanagement.techtarget.com/definition/OLAP-cube>, Apr. 28, 2012, pp. 16.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "Prosite, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, <http://statcounter.com/> Printed Jul. 19, 2013 in 17 pages.

(56) References Cited

OTHER PUBLICATIONS

Symantec Corporation, "E-Security Begins with Sound Security Policies," Announcement Symantec, Jun. 14, 2001.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
trak.io, <http://trak.io/> printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Wollrath et al., "A Distributed Object Model for the Java System", Conference on Object-Oriented Technologies and Systems, pp. 219-231, Jun. 17-21, 1996.
Wollrath et al., "A Distributed Object Model for the Java System," Conference on Object-Oriented Technologies and Systems, Jun. 17-21, 1996, pp. 219-231.
Yang et al., "HTML Page Analysis Based on Visual Cues", A129, pp. 859-864, 2001.
Yang et al., "Retroactive Answering of Search Queries", WWW 2006 Edinburgh, Scotland, May 23-26, 2006, pp. 457-466.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/264,445 dated May 14, 2015.
Notice of Allowance for U.S. Appl. No. 14/268,964 dated Dec. 3, 2014.
Notice of Allowance for U.S. Appl. No. 14/278,963 dated Sep. 2, 2015.
Notice of Allowance for U.S. Appl. No. 14/294,098 dated Dec. 29, 2014.
Notice of Allowance for U.S. Appl. No. 14/323,935 dated Oct. 1, 2015.
Notice of Allowance for U.S. Appl. No. 14/451,221 dated Aug. 4, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/579,752 dated Apr. 4, 2016.
Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14159535.5 dated May 22, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15155846.7 dated Jul. 8, 2015.

(56) References Cited

OTHER PUBLICATIONS

Official Communication for European Patent Application No. 15156004.2 dated Aug. 24, 2015.
Official Communication for European Patent Application No. 15175171.8 dated Nov. 25, 2015.
Official Communication for European Patent Application No. 15180515.7 dated Dec. 14, 2015.
Official Communication for European Patent Application No. 15184764.7 dated Dec. 14, 2015.
Official Communication for European Patent Application No. 15193287.8 dated Apr. 1, 2016.
Official Communication for European Patent Application No. 15201727.3 dated May 23, 2016.
Official Communication for European Patent Application No. 15202090.5 dated May 13, 2016.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012433 dated Mar. 11, 2016.
Official Communication for Netherlands Patent Application No. 2012436 dated Nov. 6, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/268,964 dated Sep. 3, 2014.
Official Communication for U.S. Appl. No. 14/278,963 dated Jan. 30, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.

(56) References Cited

OTHER PUBLICATIONS

Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/451,221 dated Apr. 6, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/552,336 dated Jul. 20, 2015.
Official Communication for U.S. Appl. No. 14/571,098 dated Mar. 11, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/580,218 dated Jun. 26, 2015.
Official Communication for U.S. Appl. No. 14/581,920 dated Mar. 1, 2016.
Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/676,621 dated Jul. 30, 2015.
Official Communication for U.S. Appl. No. 14/698,432 dated Jun. 3, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/734,772 dated Jul. 24, 2015.
Official Communication for U.S. Appl. No. 14/746,671 dated Sep. 28, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/857,071 dated Mar. 2, 2016.
Official Communication for U.S. Appl. No. 15/072,174 dated Jun. 1, 2016.
Restriction Requirement for U.S. Appl. No. 14/857,071 dated Dec. 11, 2015.
Notice of Allowance for U.S. Appl. No. 14/584,961 dated Jul. 13, 2017, 58 pages.
Notice of Allowance for U.S. Appl. No. 15/152,017 dated Sep. 6, 2016, 12 pages.

(56) References Cited

OTHER PUBLICATIONS

Notice of Allowance for U.S. Appl. No. 15/159,622 dated Oct. 6, 2017, 56 pages.
Official Communication for European Patent Application No. 14189344.6 dated Jun. 27, 2017, 24 pages.
Official Communication for European Patent Application No. 14189344.6 dated May 8, 2017, 13 pages.
Official Communication for European Patent Application No. 14189344.6 dated Jan. 9, 2017, 12 pages.
Official Communication for European Patent Application No. 15201881.8 dated Sep. 27, 2017, 9 pages.
Official Communication for European Patent Application No. 15201924.6 dated Oct. 9, 2017, 6 pages.
Official Communication for U.S. Appl. No. 14/584,961 dated Mar. 9, 2017, 21 pages.
Official Communication for U.S. Appl. No. 14/815,459 dated Jun. 13, 2016, 44 pages.
Official Communication for U.S. Appl. No. 15/159,622 dated May 10, 2017, 5 pages.
Restriction Requirement for U.S. Appl. No. 13/839,026 dated Apr. 2, 2015, 5 pages.
Notice of Acceptance for Australian Patent Application No. 2014250637 dated Mar. 26, 2018, 3 pages.
Official Communication for European Patent Application No. 19171133.2 dated Jun. 11, 2019, 5 pages.
Official Communication for European Patent Application No. 15201924.6 dated May 18, 2018, 5 Pages.
Official Communication for U.S. Appl. No. 15/293,140 dated Jan. 11, 2018, 63 pages.
Official Communication for U.S. Appl. No. 14/859,882 dated Mar. 21, 2019, 33 pages.
Official Communication for U.S. Appl. No. 14/859,882 dated Sep. 21, 2018, 30 pages.
Official Communication for U.S. Appl. No. 14/859,882 dated Feb. 8, 2018, 76 pages.
Official Communication for U.S. Appl. No. 15/335,903 dated Jul. 16, 2019, 66 pages.
Official Communication for U.S. Appl. No. 15/782,236 dated Jan. 14, 2019, 61 pages.
Official Communication for U.S. Appl. No. 15/782,236 dated Mar. 19, 2019, 10 pages.

* cited by examiner

800

From: Recurring Search
To: Daniel.Fuld@acme-bank.com
Sent: 10/20/1514 3:16PM GMT
Subject: Alerts Detected for "Group Test Hits" — 802

Recurring Search has found new activity for "Group Test Hits"

Created by Andrew at October 15, 2015 13:16:16 05:00
804A — 806A
View summary in Alerts Dossier or Alert Inbox
Manage and Edit your recurring searches
808A

850

From: Recurring Search
To: Daniel.Fuld@acme-bank.com
Sent: 10/20/1514 3:16PM GMT
Subject: Alerts Detected for "Group Test Hits"

22 new search result(s) have been found.

852

| Computer Name | Client IP Address | GMT Time |
|---|---|---|
| prod.example.net | 111.11.111.111 | 2015-10-21 13:13:56 GMT |
| application.example.net | 111.10.111.111 | 2015-10-21 13:13:57 GMT |
| ab003.prod.com | 195.112.111 | 2015-10-21 13:14:46 GMT |
| ... | | |

Created by Andrew at October 15, 2015 13:16:16 05:00
854A — 856A
View summary in Alerts Dossier or Alert Inbox
Manage and Edit your recurring searches
858A

860

| Identifier | License Plate | Timestamp | Lat | Long |
|---|---|---|---|---|
| 1 | 25A23 | 2015-11-21 13:13:56 GMT | 37.40445 | -122.085271 |
| 10 | LL2468 | 2015-11-21 13:13:57 GMT | 37.44607 | -122.159123 |
| 55 | 381287 | 2015-11-21 13:14:46 GMT | 37.40445 | -122.085271 |
| ... | | | | |

FIG. 8

You have been redirected to the most recent version of this alert. Return to alert 9606

⚠ ? "Group Test Hits" Has Been Detected   [Take Action ▼] [Export... ▼]

Triggered by RECURRING SEARCH AA TEAM   [OPEN]

? Detector created by Andrew on October, 15 2015 13:16:16-05:00
? Search range covered October, 15 2015 13:16:16-05:00 to October 21, 2015 08:50:46-05:00
? Records span from October, 21 2015 07:07:19-05:00 to October 21, 2015 08:14:22-05:00
? 1000 total records found for 1 of 1 terms in 1 of 1 data sources
? Click here to run the Web search ♣ ASSIGNED TO Unassigned
◉ AUTHORED BY Unwatched

| Recurring Search Details | |
|---|---|
| Title | Author |
| Group Test Hits | Andrew |
| Description | |
| Guard to lose that. Group detectors are running | |
| Date Created | Date Last Updated |

▲ SHOW LOGS (500)

FIG. 9

"Group Test Hits" Has Been Detected

2015/10/21 15:27　　AA Team　　OPEN

Assignee　　Unassigned
　　　　　　　　　　　　　　　　　　Watchers　　Unwatched

Conclusions
- Recurring search created by Andrew on October 15, 2015 13:16:16-05:00
- Search range covered October 15, 2015 13:16:16-05:00 to October 21, 2015 08:50:46-05:00
- Records span from: October 21, 2015 07:07:19-05:00 to October 21, 2015 08:14:22-05:00
- 1000 total records found for 1 of 1 terms in 1 of 1 data sources Click here to run Web search

FIG. 11B

SAVE AS RECURRING SEARCH

NAME

Recurring search on DNS

DESCRIPTION

Brief description

START DATE

Apr 8, 2016 1:06 PM

EXPIRY DATE

May 8, 2016 1:06 PM

SEND ALERTS TO

Comma separated list of email ids

CANCEL  SAVE

FIG. 17

SAVED RECURRING SEARCHES

| NAME | DESCRIPTION | STARTS | EXPIRES | STATUS | LINK |
|---|---|---|---|---|---|
| Acme trends | Will send emails when a trending topic mentions Acme. | Feb 9, 2016 2:51 PM | Mar 9, 2016 2:51 PM | Disabled | EDIT |
| Recurring search on DNS | test | Mar 21, 2016 5:31 PM | Jul 16, 2015 2:10 PM | Disabled | EDIT |
| Trending Acme mentions | Searching for mentions of Acme | Feb 9, 2016 12:10 PM | Mar 9, 2016 12:10 PM | Enabled | EDIT |
| Recurring search on DNS | | Feb 29, 2016 10:58 PM | Mar 29, 2016 10:58 PM | Enabled | EDIT |
| Trending Acme | Searching mentions of Acme on social networking service | Feb 9, 2016 12:18 PM | Mar 9, 2016 12:18 PM | Disabled | EDIT |

PERIODIC DATABASE SEARCH MANAGER FOR MULTIPLE DATA SOURCES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 15/152,017 entitled "Periodic Database Search Manager For Multiple Data Sources" filed May 11, 2016, which claims benefit of U.S. Provisional Patent Application Ser. No. 62/249,088 entitled "Periodic Database Search Manager for Multiple Data Sources" filed Oct. 30, 2015 and U.S. Provisional Patent Application Ser. No. 62/330,465 entitled "Periodic Database Search Manager for Multiple Data Sources" filed May 2, 2016. Each of these applications are hereby incorporated by reference herein in their entireties.

CROSS-REFERENCE TO RELATED APPLICATIONS

This application hereby incorporates by reference in their entireties, and for all purposes, each of the following:

U.S. Pat. No. 8,799,240 entitled "System and Method for Investigating Large Amounts of Data," which issued from U.S. patent application Ser. No. 13/167,680 filed Jun. 23, 2011 ("the '240 patent").

U.S. Pat. No. 9,092,482 entitled "Fair Scheduling for Mixed-Query Loads," which issued from U.S. patent application Ser. No. 13/826,228 filed Mar. 14, 2013 ("the '482 patent").

U.S. patent application Ser. No. 14/859,882 entitled "Systems and Interactive User Interfaces For Dynamic Retrieval, Analysis, and Triage of Data Items" filed Sep. 21, 2015 ("the '882 application").

BACKGROUND

In the area of computer-based platforms, a database may be queried.

SUMMARY

The systems, methods, and devices described herein each have several aspects, no single one of which is solely responsible for its desirable attributes. Without limiting the scope of this disclosure, several non-limiting features will now be discussed briefly.

One embodiment includes a computer-implemented method for scheduling recurrent searches of multiple disparate electronic logs and for distributing results of the recurrent searches, the computer-implemented method comprising: storing a first plurality of search results in a non-transitory computer storage medium; accessing a search object, the search object comprising one or more search terms, first and second data source identifiers, and a frequency, wherein the first data source identifiers corresponds to a first data source and the second data source identifier corresponds to a second data source, and wherein each data source of the first and second data sources comprises an electronic log; determining to query the first and second data sources based at least in part on the frequency; querying the first and second data sources, wherein each electronic log of the first and second data sources comprises electronic log entries, wherein said querying determines a second plurality of search results; comparing the first plurality of search results to the second plurality of search results; in response to said comparison, determining a new search result, wherein the new search result is present in the second plurality of search results and not present in the first plurality of search results; and transmitting a first alert, wherein the first alert corresponds to the new search result.

In some embodiments, the computer-implemented method of the preceding paragraph can include a combination or sub-combination of features. The first alert can include an electronic communication to a recipient. The computer-implemented method can further include: serializing the first plurality of search results to first data, wherein storing the first plurality of search results comprises storing the first data in the non-transitory computer storage medium; accessing the first data from the non-transitory computer storage medium; and deserializing the first data to a first plurality of objects, wherein comparing the first plurality of search results to the second plurality of search results comprises comparing the first plurality of objects to the second plurality of search results. The computer-implemented method can further include: serializing the second plurality of search results to second data; and replacing, in the non-transitory computer storage medium, the first data with the second data. The computer-implemented method can further include: querying the first data source at a first time, wherein said querying of the first data source determines the first plurality of search results, wherein the new search result corresponds to a log entry in the first data source, the log entry comprising a timestamp, the timestamp predating the first time, and wherein the log entry was added to the first data source after the first time. The computer-implemented method can further include: receiving, from a user interface, user input corresponding to data properties of the search object; and generating the first search object from the user input. The first plurality of search results can correspond to a first set of data objects, and the second plurality of search results can correspond to a second set of data objects, and wherein comparing the first plurality of search results to the second plurality of search results comprises using a set comparison operation on the first set of data objects and the second set of data objects. The search object can further include an event condition, and determining to query the first and second data sources is further based at least in part on an event condition. The computer-implemented method can further include: receiving an event, and wherein determining to query the first and second data sources is further based at least in part on the event condition indicating that the event has occurred. The event can correspond to a data sync of at least one of the first data source or the second data source.

Another embodiment includes a non-transitory computer storage medium for storing computer executable instructions that when executed by a computer hardware processor perform operations comprising: accessing a search object, the search object comprising one or more search terms, a data source identifier, and a frequency, wherein the data source identifier corresponds to a first data source; querying the first data source at a first time, wherein said querying at the first time determines a first plurality of search results; determining to query the first data source again based at least in part on the frequency; querying the first data source at a second time, wherein said querying at the second time determines a second plurality of search results; comparing the first plurality of search results to the second plurality of search results; in response to said comparison, determine a new search result, wherein the new search result is present in the second plurality of search results and not present in the first plurality of search results; and transmitting a first alert, wherein the first alert corresponds to the new search result.

In some embodiments, the non-transitory computer storage medium of the preceding paragraph can include a combination or sub-combination of features. The first alert can include an electronic communication to a recipient. The operations can further include: serializing the first plurality of search results to first data; storing the first data in a second non-transitory computer storage medium; accessing the first data from the second non-transitory computer storage medium; and deserializing the first data to a first plurality of objects, wherein comparing the first plurality of search results to the second plurality of search results comprises comparing the first plurality of objects to the second plurality of search results. The operations can further include: serializing the second plurality of search results to second data; and replacing, in the second non-transitory computer storage medium, the first data with the second data. The new search result can correspond to a log entry in the first data source, the log entry can include a timestamp, the timestamp predates the first time, and wherein the log entry was added to the first data source between the first time and the second time. The operations can further include: receiving, from a user interface, user input corresponding to data properties of the search object; and generating the first search object from the user input. The first plurality of search results can correspond to a first set of data objects, and the second plurality of search results can correspond to a second set of data objects, and wherein comparing the first plurality of search results to the second plurality of search results comprises using a set comparison operation on the first set of data objects and the second set of data objects. The search object can further include an event condition, and determining to query the first data source at the first time is further based at least in part on an event condition. The operations can further include: receiving an event, and wherein determining to query the first data source at the first time is further based at least in part on the event condition indicating that the event has occurred. The event can correspond to a data sync of at least the first data source.

Another embodiment includes a system for scheduling recurrent searches of multiple disparate data sources and for distributing results of the recurrent searches, the system comprising: a non-transitory computer storage medium configured to store a first plurality of search results; a search system, the search system configured to search a plurality of data sources, wherein each data source of the plurality of data sources comprises an electronic log; an alert system; and one or more hardware computer processors programmed, via executable code instructions, to: access a search object, the search object comprising one or more search terms, a plurality of data source identifiers, and an execution condition, wherein the plurality of data source identifiers corresponds to first and second data sources of the plurality of data sources; determine to query the first and second data sources based at least in part on the execution condition; query, via the search system, the first and second data sources, wherein each electronic log of the first and second data sources comprises electronic log entries, wherein said querying determines a second plurality of search results; compare the first plurality of search results to the second plurality of search results; in response to said comparison, determine a new search result, wherein the new search result is present in the second plurality of search results and not present in the first plurality of search results; transmit a first alert to the alert system, wherein the first alert corresponds to the new search result.

In some embodiments, the computing system of the preceding paragraph can include a combination or sub-combination of features. The execution condition can include at least one of a frequency or an event condition. The one or more hardware processors can be further programmed to: receive an event, and wherein determining to query the first and second data sources is further based at least in part on the execution condition indicating that the event has occurred. The event can correspond to a data sync of at least one of the first data source or the second data source. The one or more hardware processors can be further programmed to: serialize the first plurality of search results to first data, wherein the non-transitory computer storage medium is configured to store the first plurality of search results as the first data; access the first data from the non-transitory computer storage medium; and deserialize the first data to a first plurality of objects, wherein comparing the first plurality of search results to the second plurality of search results comprises comparing the first plurality of objects to the second plurality of search results. The one or more hardware processors can be further programmed to: serialize the second plurality of search results to second data; and replace, in the non-transitory computer storage medium, the first data with the second data. The one or more hardware processors can be further programmed to: query, via the search system, the first data source at a first time, wherein said querying of the first data source determines the first plurality of search results, wherein the new search result corresponds to a log entry in the first data source, the log entry comprises a timestamp, the timestamp predates the first time, and wherein the log entry was added to the first data source after the first time. The first plurality of search results can correspond to a first set of data objects, and the second plurality of search results can correspond to a second set of data objects, and wherein comparing the first plurality of search results to the second plurality of search results comprises using a set comparison operation on the first set of data objects and the second set of data objects.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 8 illustrates example electronic communication alerts, according to some embodiments of the present disclosure.

FIGS. 9, 10, and 11A-11B illustrate example user interfaces of the alert system, according to some embodiments of the present disclosure.

FIGS. 15, 16, 17, and 18 illustrate additional example user interfaces of the search management system, according to some embodiments of the present disclosure.

DETAILED DESCRIPTION

Figure 1:
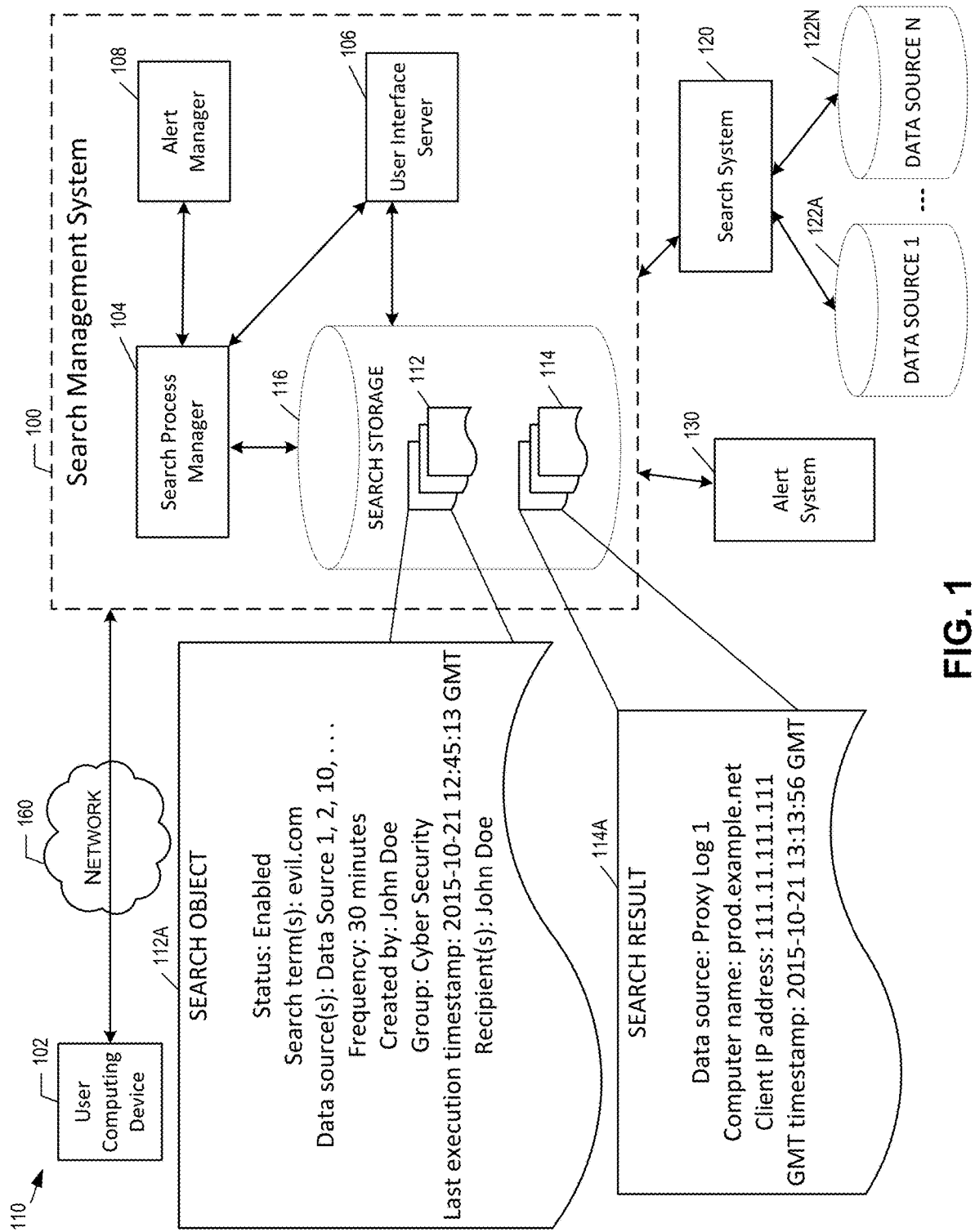
FIG. 1 is a block diagram illustrating an example search management system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. The terms "database" and "data source" may be used interchangeably in the present disclosure.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Data Object (Object), Data Item (Item), or Data Entity (Entity): A data container for information. A data object may be associated with a number of definable properties (as described herein). As described herein, a search object is an example data object for conducting recurrent searches. A data object may represent a specific thing, or a group of things, in the world. For example, a data object may represent an item such as a person, a place, an organization, an account, a computer, an activity, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data object," "data item," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Recurrent (or Recurring) Search: Refers to a search of a data source that is scheduled and/or occurs one or more times. A non-limiting example recurrent search is a periodic search, such as a search occurring and/or being initiated every 15 minutes, 30 minutes, hourly, daily, weekly, any other periodic pattern, and/or some combination thereof. In some embodiments, a recurrent search may be based on some other schedule that is non-periodic. For example, a recurrent search may be triggered by an event and/or may be based on evaluation of data coming into the system. For example, the system may be configured to initiate a search when new data is added to a data source, which may occur on an ad-hoc basis. Accordingly, the event and/or data-driven searches may occur in real-time or substantially in real-time.

Overview

Analysts may be interested in searching enormous data sets on a recurring and/or automatic basis. The data sets may be from multiple disparate data sources that include giga-bytes, terabytes, or even petabytes of data. Non-limiting example data sources include electronic logs, such as, proxy logs, virtual private network ("VPN") logs, malware lists, email logs, phone call logs, vehicle logs, geographic logs, or other electronic logs discussed herein. Example searches include partial text string matching for known uniform resource locators ("URLs") or names of malware within the electronic logs. Accordingly, the systems and techniques discussed herein may be used to automatically identify potential threats that may be intrinsically tied to network and/or computer technology, such as proxy logs, network security, malware, phishing, and/or other computer-related areas. Those analysts may also be interested in receiving alerts via electronic communications and/or via an alert system to review search results.

Disclosed herein are systems and methods for enabling a user to specify searches of multiple data sources to automatically occur on a periodic basis. For example, a user may create a search object that specifies the data sources of interest, search terms, and a frequency for the search to occur. The user may configure new and/or edit recurrent searches on an ad-hoc basis through the user interface of the system. Example frequencies for recurrent searches include every fifteen minutes, thirty minutes, hourly, daily, weekly, any other periodic pattern, and/or some combination thereof. In some embodiments, queries are sent to a search system that efficiently searches multiple disparate data sources. For example, the search system may be optimized to efficiently search the data sources based on the last search timestamp to only search data source entries after the last search timestamp. The user may also review and edit previously created searches, and review results of searches. The system automatically performs the specified searches, and notifies the user and/or a team of the user each time new results are found. For example, an email electronic communication alert, such as email, may be sent to one or more users and/or teams. In some embodiments, alerts may be sent to an alert system that enables a user and/or users of one or more permissioned groups to view the search results.

Embodiments of the present disclosure relate to an efficient and/or optimized alerting system. For example, search results may be viewed in more detail in an optimized alert graphical user interface. In an embodiment, data related to search results is transmitted from a search management system to an alert system. In this embodiment, the alert system may use the received data to generate the alert and/or to enhance the received data with additional information that may be useful to an analyst in reviewing the search result. Additionally or alternatively, the alert system may send an electronic communication alert that optionally includes a link to view the alert in the alert system.

Embodiments of the present disclosure relate to a search management system that may automatically search multiple data sources in a memory-efficient and/or resource-efficient manner. For example, the recurrent searches of the search management system may repeatedly search the multiple data sources such that the searching is targeted towards recently added data and/or avoids recurrent searches of previously searched data, which may be from data sources of terabytes or petabytes of data. Accordingly, the systems and methods described herein may provide early notification associated with one or multiple data sources when there has been an update to those respective data sources that correspond to user-specified criteria.

Example Search Management System

FIG. 1 illustrates a search management system 100, according to some embodiments of the present disclosure. In the embodiment of FIG. 1, the database environment 110 includes a network 160, a search management system 100, user computing device 102, a search system 120, and an alert system 130. Various communications between these devices are illustrated. For example, user computing device 102 may send user input, such as queries and/or recurrent search schedules, to the search management system 100.

The example search management system 100 includes a search process manager 104, a user interface server 106, an alert manager 108, and search storage 116. In this embodiment, a user may perform operations via the user interface server 106 such as selecting data sources of interest, specifying one or more search terms, reviewing and/or editing previously created searches, and/or reviewing results of searches, as described in further detail herein. As illustrated, user created recurrent searches may be stored in search storage 116 as search objects 112. Search process manager 104 may access the search objects 112 to automatically query the data sources 122 via the search system 120. The search process manager 104 may store the search results 114 from the search system 120 in the search storage 116, cause presentation of the results in the user interface server 106, and/or distribute results via the alert system 130, each of which is as described in further detail herein. Additionally or alternatively, the search process manager 104 may store the search results 114 from the search system 120 in the data sources 122 of the search system 120.

In this embodiment, the search management system 100 communicates with the search system 120 and the alert system 130. For example, the search system 120 may be configured to query disparate data sources 122 in an efficient manner. The example alert system 130 may provide a user interface that enables users to view alerts and/or search results. In other embodiments, the search system 120 and/or the alert system 130 are optional and the search management system 100 may query the data sources 122 and/or present the user interfaces described herein.

Example Search Processes

Figure 2:
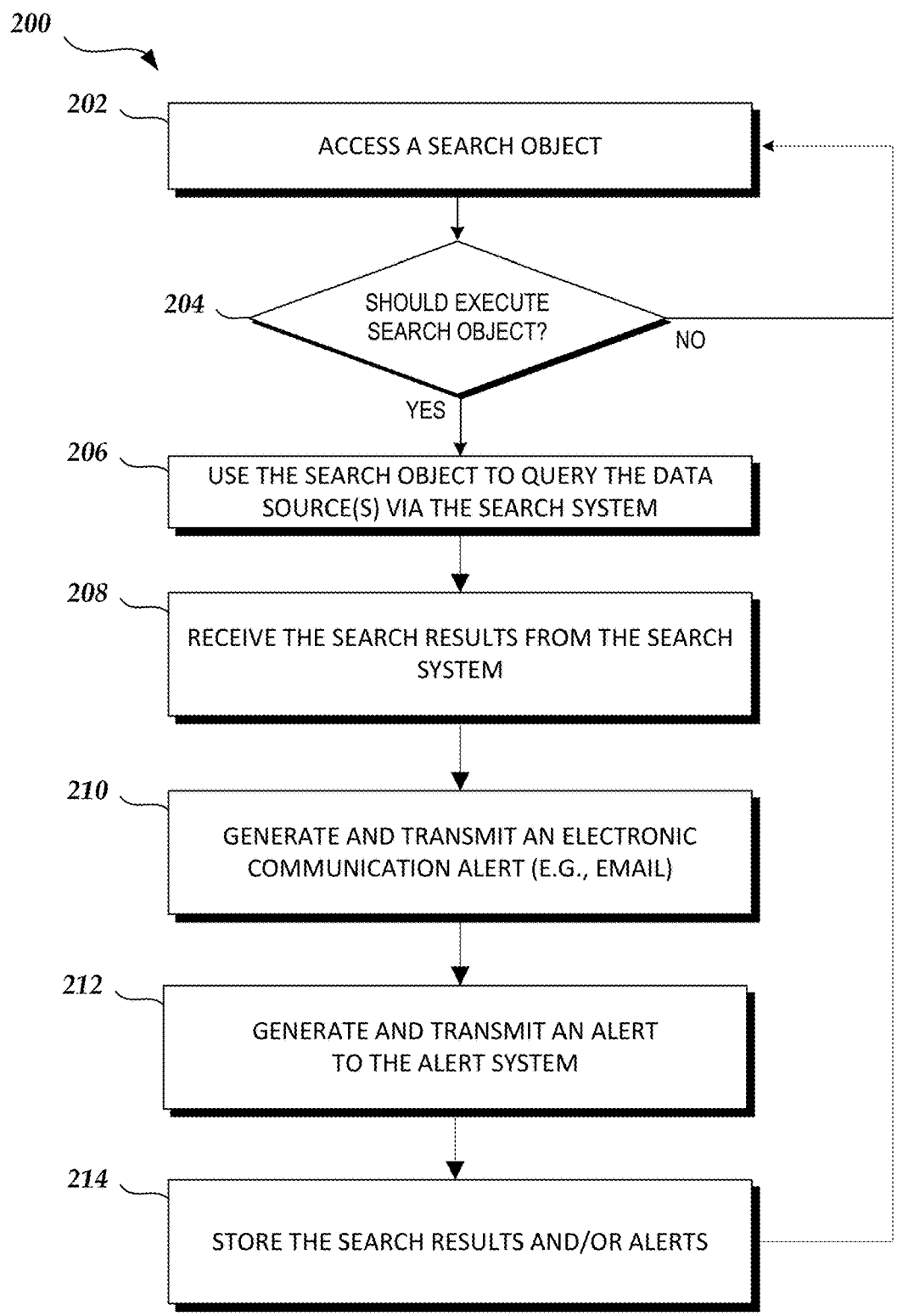
FIG. 2 is a flowchart of an example method of executing recurrent searches, according to some embodiments of the present disclosure.

FIG. 2 is a flowchart of an example method of executing recurrent searches, according to some embodiments of the present disclosure. Although the method is described in conjunction with the systems of FIG. 1, persons skilled in the art will understand that any system configured to perform the method, in any order, is within the scope of this disclosure. The method 200 may be performed by the systems 100, 120, or 130 of FIG. 1, such as the various components of the search management system 100 of FIG. 1 as discussed herein, including the search process manager 104, the user interface server 106, and/or the alert manager

108. Depending on the embodiment, the method 200 may include fewer or additional blocks and/or the blocks may be performed in order different than is illustrated.

Beginning at block 202, the search process manager 104 accesses a search object. A search object may be created and/or edited via the user interface server 106, which is described in greater detail with respect to FIGS. 4-7. The example search object 112A of FIG. 1 may illustrate various properties of a search object. For example, a search object may include a status property that indicates whether the search object is "enabled" or "disabled." The search object may specify: one or more search terms, such as an IP address, domain name, phone number, and/or any other strings; one more data sources; a frequency, such as a time frequency of thirty minutes or one hour; a parameter for when the search should expire, such as automatically becoming disabled; an event that may cause a search to run; a permissions group; and/or a last execution timestamp that indicates the last time a search was run. As will be described with respect to process 200, the search process manager 104 may continually poll the search storage 116 to access the search objects on a recurring basis.

At block 204, the search process manager 104 determines whether to initiate a search based on the accessed search object at block 202. For example, the search process manager 104 checks the status property and determines to initiate a search based on the search object if the status is "enabled." If the status is "disabled," the search process manager 104 exits the process loop and returns to block 202 process other search objects and/or this same search object at a later time (for example, the status of the search object may be changed from "disabled" to "enabled.") The search process manager 104 may also determine whether to initiate a search from the search object based on the current timestamp, and the frequency and the last execution timestamp properties of the search object. For example, the search object contains a frequency property for recurrent searches every fifteen minutes and a last execution timestamp of 2015-10-21 12:45:13 GMT. The search process manager 104 accesses the current timestamp. If the current timestamp is 2015-10-21 12:50:30 GMT, then the search process manager 104 does not initiate a search because the fifteen minute periodic time has not elapsed and the search process manager 104 exits the loop and returns to block 202. However, if the current timestamp is 2015-10-21 13:01:10 GMT, then the search process manager 104 determines that a search should be initiated and proceeds to the next block.

Additionally or alternatively, the search process manager 104 determines whether to initiate a search based on an event. For example, the accessed search object may include an event condition that may cause a search to run. Example events include a data sync event or a scheduled user downtime event. Example user downtime events include when a computing system for users is unavailable and/or a beginning time for when there is low usage by users of the computing system, e.g., after work hours, late at night, and/or early in the morning. Continuing with the example, the search process manager 104 may receive an indication or event and/or determine that the event has occurred, and then initiate a search based on the received indication or event and/or determination that the event has occurred. In some embodiments, it may be advantageous to initiate searches based on events. For example, initiating a search after a data sync may advantageously search the recently updated data. As another example, initiating a search after user downtime may advantageously avoid interfering and/or adversely affecting the user experience since searching the data sources may adversely affect the user experience due to performance impacts from the searching.

At block 206, the search process manager 104 uses the search object to query the one or more data sources via the search system. In some embodiments, the search system 120 includes an Application Programming Interface to receive the one or search terms, the one or more data sources, and other inputs. As discussed herein, the one or more data sources may include electronic logs. Further, the search system 120 may efficiently search the data source(s) to only search those data source entries that have a corresponding timestamp after the last execution timestamp of the search object. Accordingly, previously found search results are not included in the search results from the current periodic search. In other words, in some embodiments, the search process manager 104 searches the date ranges that it has not searched before. For example, if the search process manager 104 initiated a search at 10:00 and then initiated another search again at 10:15, the search process manager 104 would search the search system 120 for the specific search terms in the 10:00-10:15 time range. The most recently searched time or the last execution timestamp is tracked in the search object. Searching by the search system 120 may include textual, partial textual searching, geographic searching, searching using regular expressions, and/or searching using wildcards. For example, if the search string is "www.evil.com," the search system 120 may search the one or more data sources for entries that match "www.evil.com" or a partial match such as "evil.com." Additional information regarding searching via indexes and other techniques is described in the '240 patent, e.g., see Col. 15 l. 41-Col. 22 l. 34.

In some embodiments, the search system 120 searches one or more disparate data sources in an efficient manner. The data sources may be from numerous devices from one or more entities, such as proxy logs, VPN logs, malware lists, badge logs, phone call logs, blacklists, whitelists, email logs, process logs, intrusion detection system logs, credit card transaction data, etc. The search system 120 may be agnostic to the type of data sources and may be capable of supporting searches for any types of data sources. The search system 120 may efficiently search a subset of a particular electronic log and not the entire electronic log. For example, the search system 120 may identify a subset of the electronic log entries that have corresponding timestamps after a particular time. Additionally or alternatively, the search system 120 may use indexes and/or checkpoints within the electronic logs and/or data structures corresponding to the electronic logs to efficiently search the electronic logs. As discussed herein, in other embodiments, the search management system 100 searches the data sources directly.

Additional information regarding searching large amounts of data, multiple data sources, and the search system 130 is found in U.S. Pat. Nos. 8,799,240 and 9,092,482. For example, the '240 patent describes searching large amounts of data in Col. 3 l. 6-Col. 22 l. 34, and in particular describes using key-values to efficiently search multiple large data sources, each of which may be used by the search system 130. As another example, the '482 patent describes a efficiently scheduling queries of databases in Col. 3 l. 21-Col. 12 l. 34, which may be used by the search system 130.

In some embodiments, the search object supports complex logic for performing searches. For example, in addition to one or more search terms, the search object may include Boolean instructions for conducting searches. An example Boolean instruction includes Boolean algebra such as: "evil.

com & !musicevil.com," which would match results with "evil.com" but excludes the domain name of "musicevil.com." Another example Boolean instruction would be to match a particular search term with another condition. In some embodiments, the complex logic may include conditional instructions based on data types. For example, in the same search object, different search terms may be specified for different data types and/or data sources. Continuing with the example, the search object may include the search instruction: "if type==IP address then 101.12.19.11; if type==domain then evil.com," which would instruct the system to search for "101.12.19.11" among IP address data types and/or data sources and to search for "evil.com" among domain data types and/or data sources.

At block 208, the search process manager 104 receives the search results from the search system 120. The example search result 114A of FIG. 1 may illustrate various properties of a search result. In some embodiments, the properties of a search result may be customized for a particular data type and/or data source. For example, as illustrated, example search result 114A includes properties such as the data source, computer name, IP address, and a timestamp from the respective electronic log and/or data source. Other example properties for search results include a person's name and/or identifier, a malware name and/or identifier, or any other property that may be associated with an electronic log.

At block 210, the alert manager 108 and/or alert system 130 generates and transmits an electronic communication alert. For example, an email alert may be transmitted to one or more email addresses corresponding to particular users and/or list serves. In some embodiments, the email alert contains information identifying the particular search object for which search results were found. Additionally or alternatively, the email alert includes the search results and/or excerpts from the electronic log corresponding to the search results. Additional information regarding electronic communication alerts are described in further detail with respect to FIG. 8. Other example electronic communication alerts include chat message notifications and/or text message alerts.

At block 212, the alert manager 108 generates and transmits an alert to the alert system 130. For example, the alert may include the search results and/or other information associated with the respective search object for the search result. The alert system 130 may include user interfaces for presenting the alert information. Additional information regarding alerts, user interfaces, and the alert system 120 are described in further detail with respect to FIGS. 9-11. Further, additional information regarding alerts, user interfaces, and the alert system 120 is found in U.S. patent application Ser. No. 14/579,752 entitled "Systems and User Interfaces For Dynamic And Interactive Investigation Of Bad Actor Behavior Based On Automatic Clustering Of Related Data In Various Data Structures" filed Dec. 22, 2014 ("the '752 application"), which is hereby incorporated by reference in its entirety and for all purposes. For example, the '752 application describes example user interfaces for an alert system in paragraphs [0214]-[0228], among others. As another example, the alert system 130 and/or the search management system 100 may perform the clustering methods and techniques described in paragraphs [0149]-[0160], among others, of the '752 application. For example, the alert system 130 may use the search result and/or properties from the search result (such as computer name, user name, IP address, etc.) as a seed for clustering, which is described in further detail in the '752 application.

In some embodiments, the alert manager 108 generates other forms of alerts other than those described up blocks 210 and 212. For example, the alert manager 108 generates textual alerts and/or other data object alerts for use by the search management system 100. For example, the search management system 100 may present the generated alerts via the user interface server 106 and/or may store the alerts in the search storage 116, which is described in further detail below. As discussed herein, at blocks 210 and 212 and/or during other alert distribution, the alert manager 108 uses the properties of the search objects, such as the recipients and/or the permissions of the respective search objects, to determine the recipients of the alerts.

At block 214, the alert manager 108 stores the search results and/or alerts in the search storage 116. In some embodiments, the search results and/or alerts may be viewed in a user interface. Additionally or alternatively, the search management system 100 may distribute the search results and/or alerts to users and/or to other systems. In some embodiments, some of blocks 210, 212, and/or 214 are optional. For example, the alert manager 108 may send one alert instead of multiple alerts via different systems. Accordingly, following the sending of one or more alerts, process 200 returns to block 202 to continue checking and conducting recurrent searches. For example, the search object with a frequency property of 15 minutes will cause a search to be executed by the search process manager approximately every 15 minutes. In some embodiments, if there are no search results based on a particular search then no alerts will be sent.

Access Control

Figure 3:
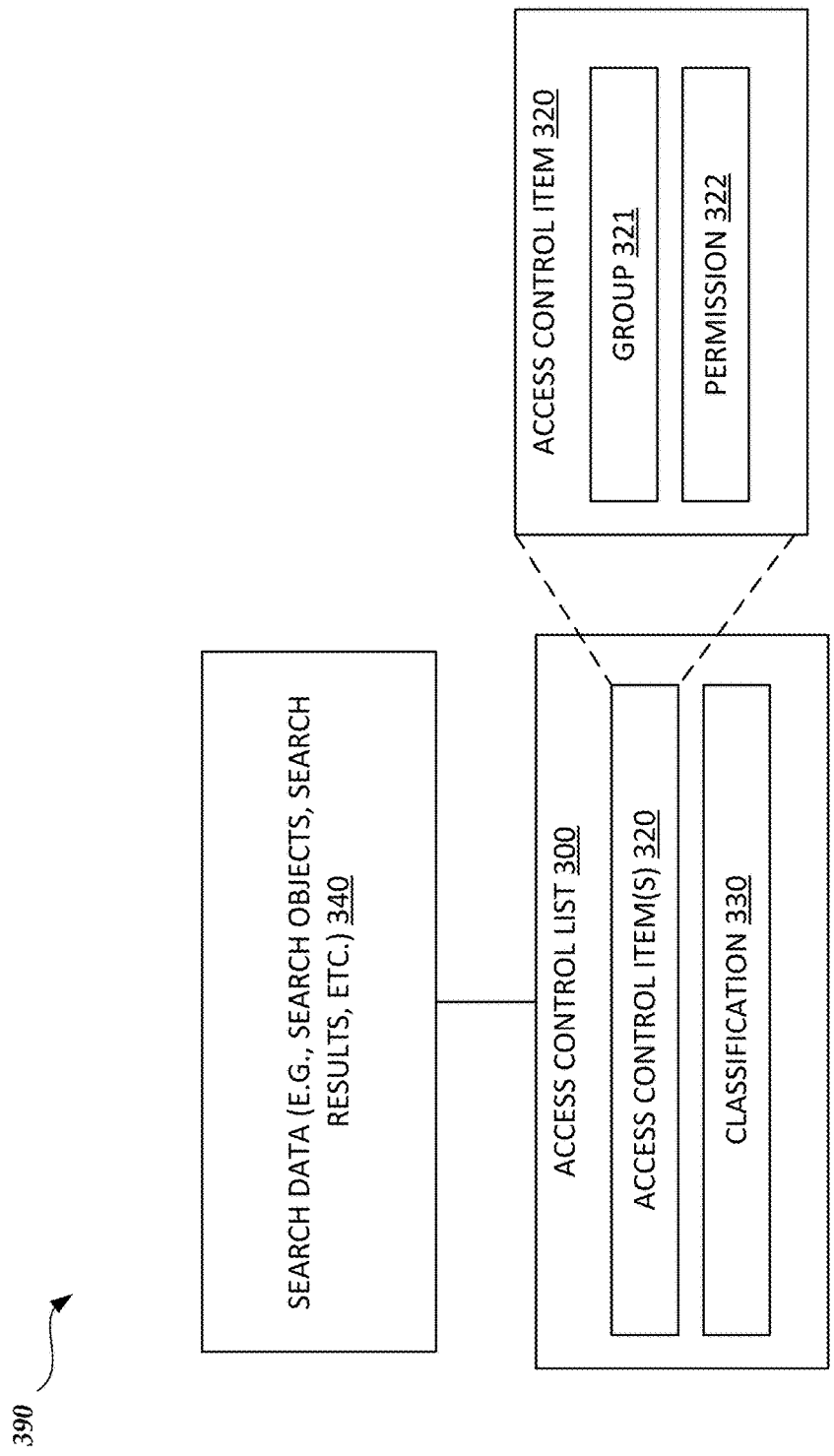
FIG. 3 is a block diagram illustrating an example access control list for search data, according to some embodiments of the present disclosure.

FIG. 3 is a block diagram illustrating an example access control list for search data, according to some embodiments of the present disclosure. In some embodiments, the search management system 100 uses access control lists to allow a user to specify which other users and/or teams are permitted to view search data, such as search objects and/or search results. Additionally or alternatively, access control lists may further specify the permissions of particular users to view and/or modify search data such as search objects. Access control environment 390 includes search data 340 and access control list 300. In some embodiments, access control list 300 is stored in a data store and/or data source of the search management system 100. Example access control list 300 includes one or more access control items 320 and zero or more classifications 330. Example access control list 300 is associated with one or more search data, such as search data 340. Thus, example access control list 300 of the search management system 100 provides a level of granularity to specify sharing rules and/or permissions on a per-data item basis. For example, during the creation and/or editing of a search object, a user may specify a group corresponding to the search object, as described in further detail with respect to FIG. 6. Accordingly, the users belonging to that group may view the search results and/or edit the search object.

Example access control item 330 includes group 321 and permission 322. Example group 321 identifies a set of users and/or teams. Example permission 322 identifies an operation that a user in the set can perform on search data 340. Additionally or alternatively, example permission 322 further identifies an operation the user in the set can perform on access control list 300. Non-limiting examples of permission 322 include read, write, owner, create, delete, read only, and/or some combination thereof.

In some embodiments, if access control list 300 has a classification 330, then a user must be authorized for the classification 330. Thus, classification 330 may override permission 322 granted to the entity and/or user. For example, one possible set of classification markings as part of classification 330 include "Top Secret," "Secret," "Confidential," "Restricted," "For Official Use Only," among others, while another example classification scheme may use the markings: "Public" and "Restricted," among others. For example, the permissions of an access control list may indicate that a particular data object should not be shared with particular users.

Example Search Management User Interfaces

FIGS. 4-7 illustrate example user interfaces of the search management system, according to some embodiments of the present disclosure. In various embodiments, aspects of the user interfaces may be rearranged from what is shown and described below, and/or particular aspects may or may not be included. However, the embodiments described below in reference to FIGS. 4-7 provides example user interfaces of the system.

Figure 4:
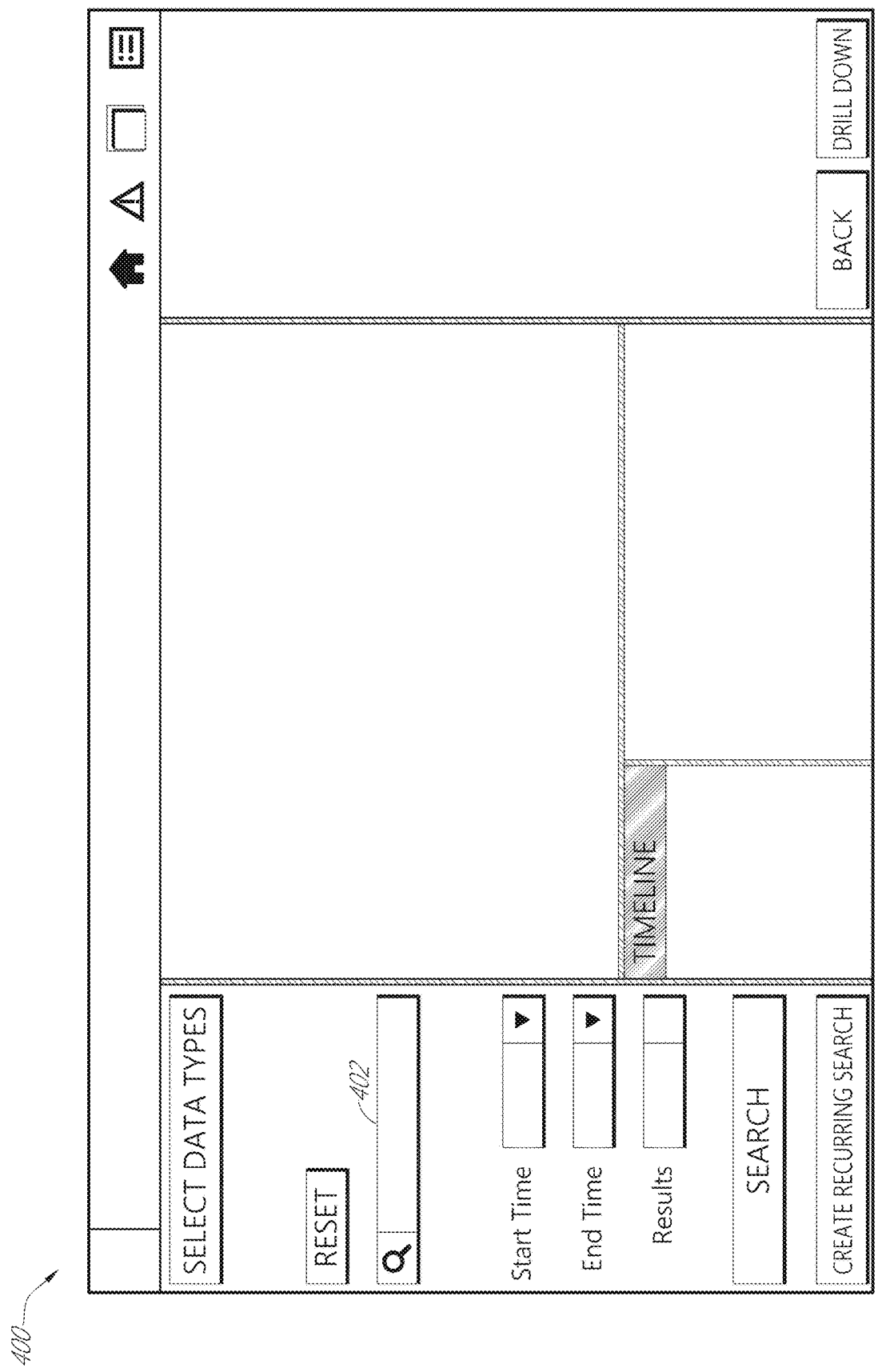
FIGS. 4, 5, 6, and 7 illustrate example user interfaces of the search management system, according to some embodiments of the present disclosure.

FIG. 4 illustrates a user interface 400 of the search management system 100 that enables a user to dynamically search one or more data sources and/or to schedule recurrent searches, according to some embodiments of the present disclosure. For example, search area 402 may enable a user to enter a search string. The user interface 400 also may enable a user to search preexisting search objects by name, search string, author, group, and/or any other property of the search object.

Figure 5:
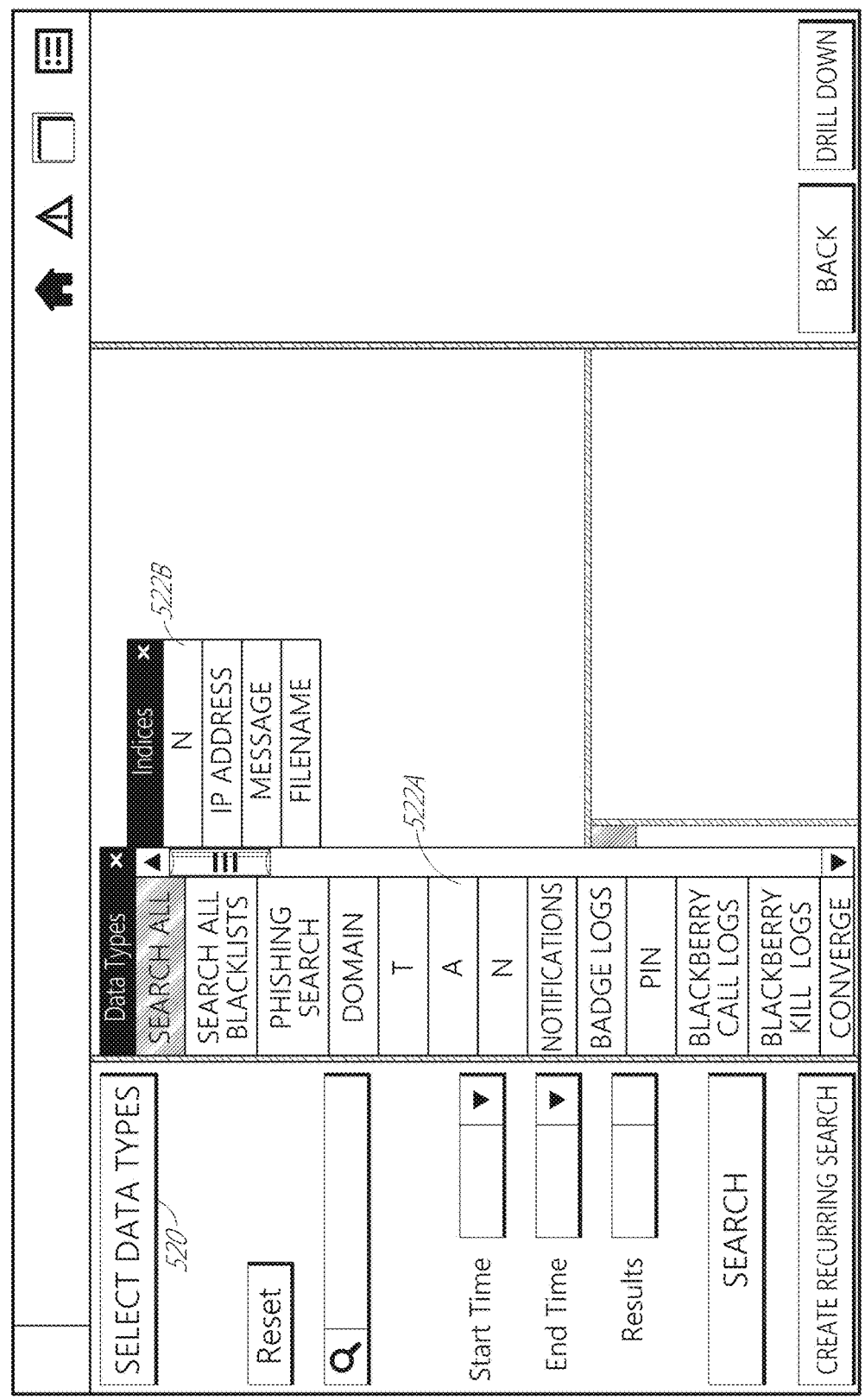

FIG. 5 illustrates another user interface 500 of the search management system 100. For example, the user interface elements of the user interface 500 may be similar to the user interface elements of the user interface 400 of FIG. 4. A user may select a data type selector 520 of the user interface 500, which may cause presentation of a hierarchical data type menu 522. In some embodiments, a user may select one or more data types and/or each data type may correspond to one or more data sources. As illustrated, a particular data type and/or multiple data types may have indexes for searching, where the index may correspond to particular properties of the electronic logs. For example, if a user wants to set up a recurrent search on proxy traffic, the user may user may select "Proxy (ALL)" data type and then select an "index" from the index menu 522B that includes "Domain/URL," "Source/Remote IP Address," "Source Host," "Category," or "Port." Thus, a user may set up a recurrent search for a known malware domain such as "evil.com" or "http:// 5.10.22.79."

Figure 6:
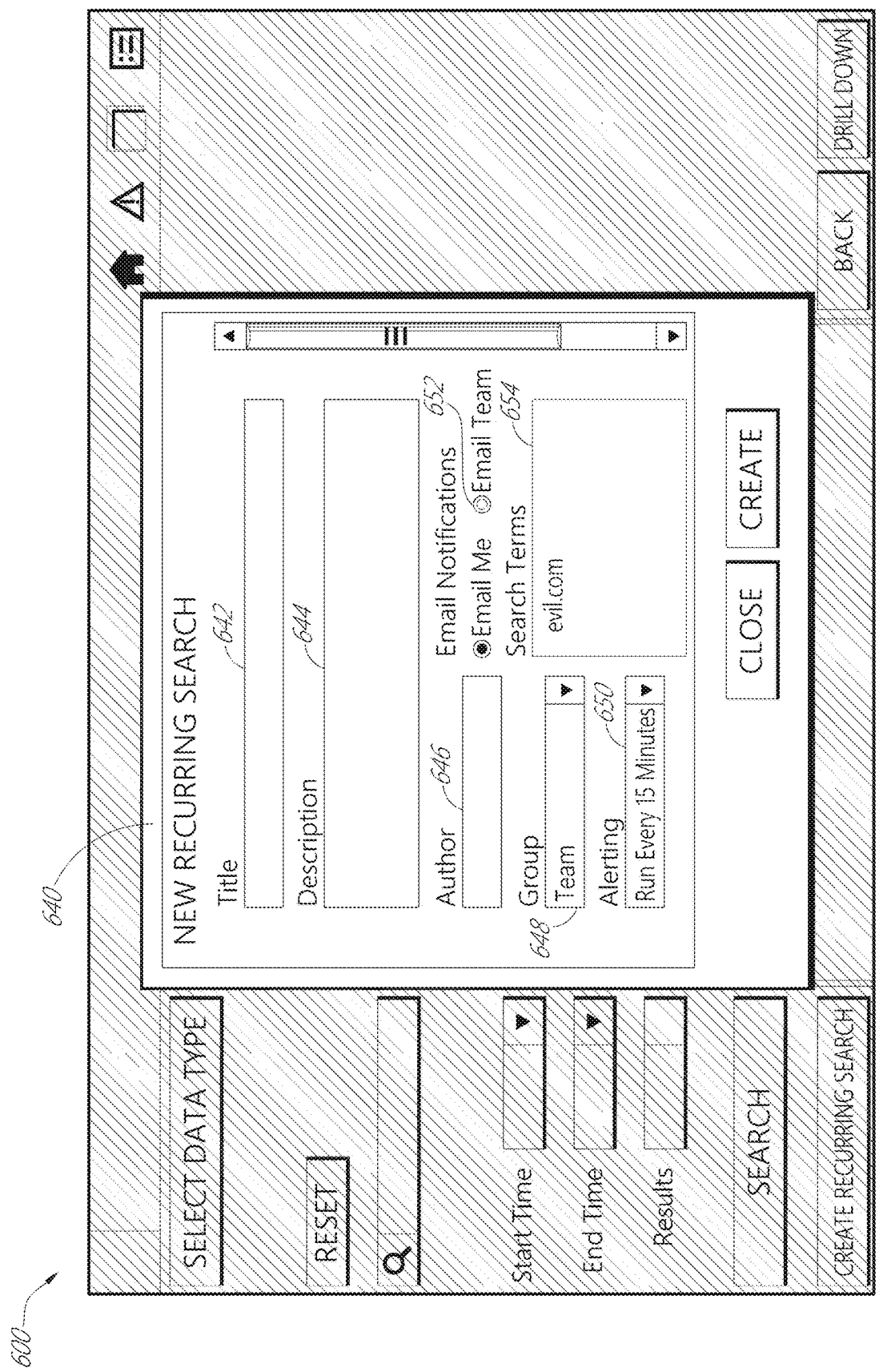

FIG. 6 illustrates a user interface 600 of the search management system 100 that enables a user to set up a recurrent search. Example user interface 600 includes input areas and/or selectors that enable user to create a recurrent search, which may correspond to a search object and its corresponding properties as described herein. For example, a recurrent search form 640 may include input areas such as: title input area 642 that corresponds to a title for the recurrent search; a description input area 644 that corresponds to a description of the recurrent search; author input area, which may be automatically populated with an identifier corresponding to the current user; a group selection area 648 that enables a user to select one or more groups that are permission to view the corresponding search object and/or search results; a frequency input selector 650 that enables a user to select the frequency of searching, such as "Run Every 15 Minutes," "Run Every 30 Minutes," etc.; an electronic communication preference selector 652 enables a user to select themselves or a team to receive electronic communication alerts; a search term input area 654 that enables a user to specify one or more search terms, such as "evil.com" or other input expressions (e.g., a regular expression and/or search term with a wildcard). While not illustrated, the recurrent search form 640 may include a listing of the data types and/or data sources for searching and/or a selector to allow a user to select the data types and/or data sources for recurrent searching.

Figure 7:
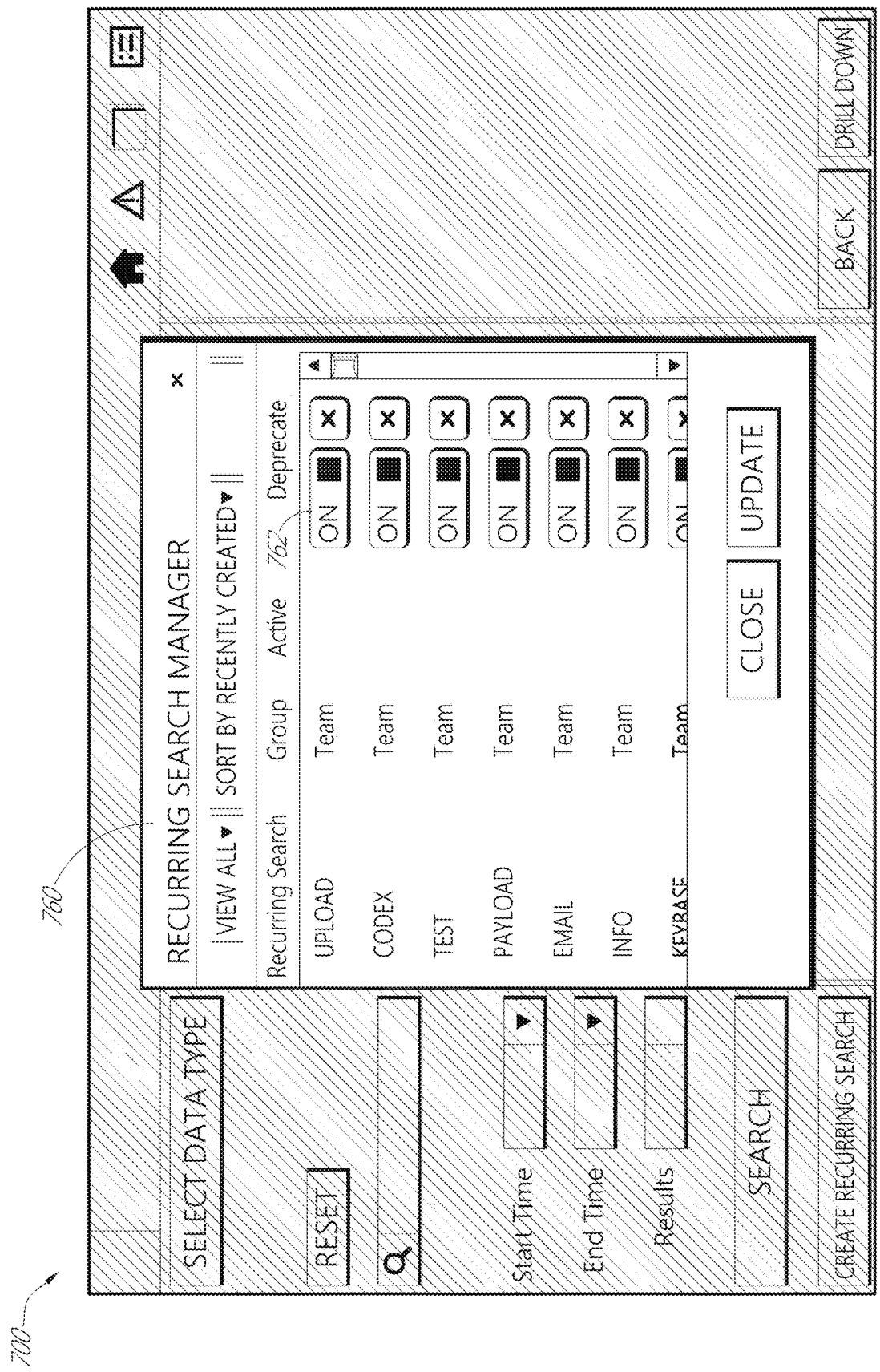

FIG. 7 illustrates a user interface 700 of the search management system 100 that enables a user to manage their recurrent searches. For example, user interface 700 includes a recurrent search management menu 760 that enables a user to disable one or more recurrent searches via a status selector 762. In example user interface 700, the recurrent search management menu 760 displays the recurrent searches that have been set up by user and/or the recurrent searches that a user is permissioned to view. The permissioned view may be based on the access control list 300 described with respect to FIG. 3. In some embodiments, recurrent search management menu 760 displays those recurrent searches that have received search results and/or have alerts (not illustrated). For example, the user interfaces of FIGS. 9, 10, and/or 11 may be integrated into user interface 700 (or vice versa).

Example Electronic Communication Alerts

FIG. 8 illustrates example electronic communication alerts, according to some embodiments of the present disclosure. FIG. 8 includes example electronic communication alerts 800 and 850 that may be generated by the recurrent search process 200 of FIG. 2 and block 210 described herein. As illustrated, electronic communication alert 800 may be an email format. Alert 800 may include a message 802 that indicates the search management system 100 as identified alerts the particular recurrent search "Group Test Hits." Alert 800 may include links that enable user to view the search results and/or edit the recurrent search. For example, link 804A may enable user to view the alert and/or search results in the alert system, which is described herein and with respect to FIGS. 9 and 10 in particular. Link 806A may enable user to view the alerts in alert inbox of the alert system, which is described in further detail with herein and with respect to FIGS. 11A-11B. Link 808A may be able the user to manage and edit their recurrent searches in the user interface of the search management system 100, such as user interface 700, which is described in further detail with respect to FIG. 7.

In other embodiments, the search management system 100 may send electronic communication alert 850 that includes the search results and/or excerpts from a log file. For example, elements of the example electronic communication alert 850 may be similar to electronic communication alert 800, such as similarities between links 804A, 806A, and 808A of alert 800 and links 854A, 856A, and 858A of alert 850, respectively. Alert 850 may include search results 852 that displays portions of the electronic log where there was a positive match based on the search object. In some embodiments, search results 852 may include a portion of the search results. For example, search results 852 may include a predefined and/or configurable number of search results, such as the 100 most recent entries from the electronic log. The search results 852 of the electronic communication may be configurable. For example, an administrator may configure the electronic communication to omit particular columns from the search results 852. As illustrated in the body of the communication alert 850, the communication alert 850 may report new results as compared to a previous search, which may correspond to the example process as described in further detail with respect to FIG. 14.

The example search results 860 illustrate another example table that may be included in the communication alert 850. For example, instead of listing IP addresses as shown in the search results 852, the search results 860 may list license plate identifiers corresponding to geographic coordinates such as latitudinal and longitudinal coordinates. As described herein, the search management system 100 may be capable of scheduling recurrent searches to identify data entries that correspond to a geographic location and/or area.

In some embodiments, the electronic communication alerts may be configurable. For example, the search management system 100 may allow users and/or administrators to configure the electronic communication alerts. Continuing with the example, a user and/or administrator may specify the information and/or links in the electronic communication alerts, such as any of the information and/or features in the user interfaces described herein.

Example Alert User Interfaces

Figure 10:

FIGS. 9-11 illustrate example user interfaces of the alert system, according to some embodiments of the present disclosure. In various embodiments, aspects of the user interfaces may be rearranged from what is shown and described below, and/or particular aspects may or may not be included. However, the embodiments described below in reference to FIGS. 9-11 provides example user interfaces of the system.

FIG. 9 illustrates a user interface 900 of the alert system 130 that enables a user to view an alert generated by the search management system 100, according to some embodiments of the present disclosure. Further, additional information regarding embodiments of alert user interface 900 is found in U.S. patent application Ser. No. 14/579,752. For example, the '752 application describes embodiments of user interface 900 for an alert system in paragraphs [0217]-[0219], among others.

FIG. 10 illustrates a user interface 1000 of the alert system 130 that enables a user to view the search results from the search management system 100 and/or the search system 120, according to some embodiments of the present disclosure. Further, additional information regarding embodiments of results user interface 1000 is found in U.S. patent application Ser. No. 13/968,752. For example, the '752 application describes embodiments of user interface 1000 for an alert system in paragraphs [0220]-[0223], among others.

Figure 11A:
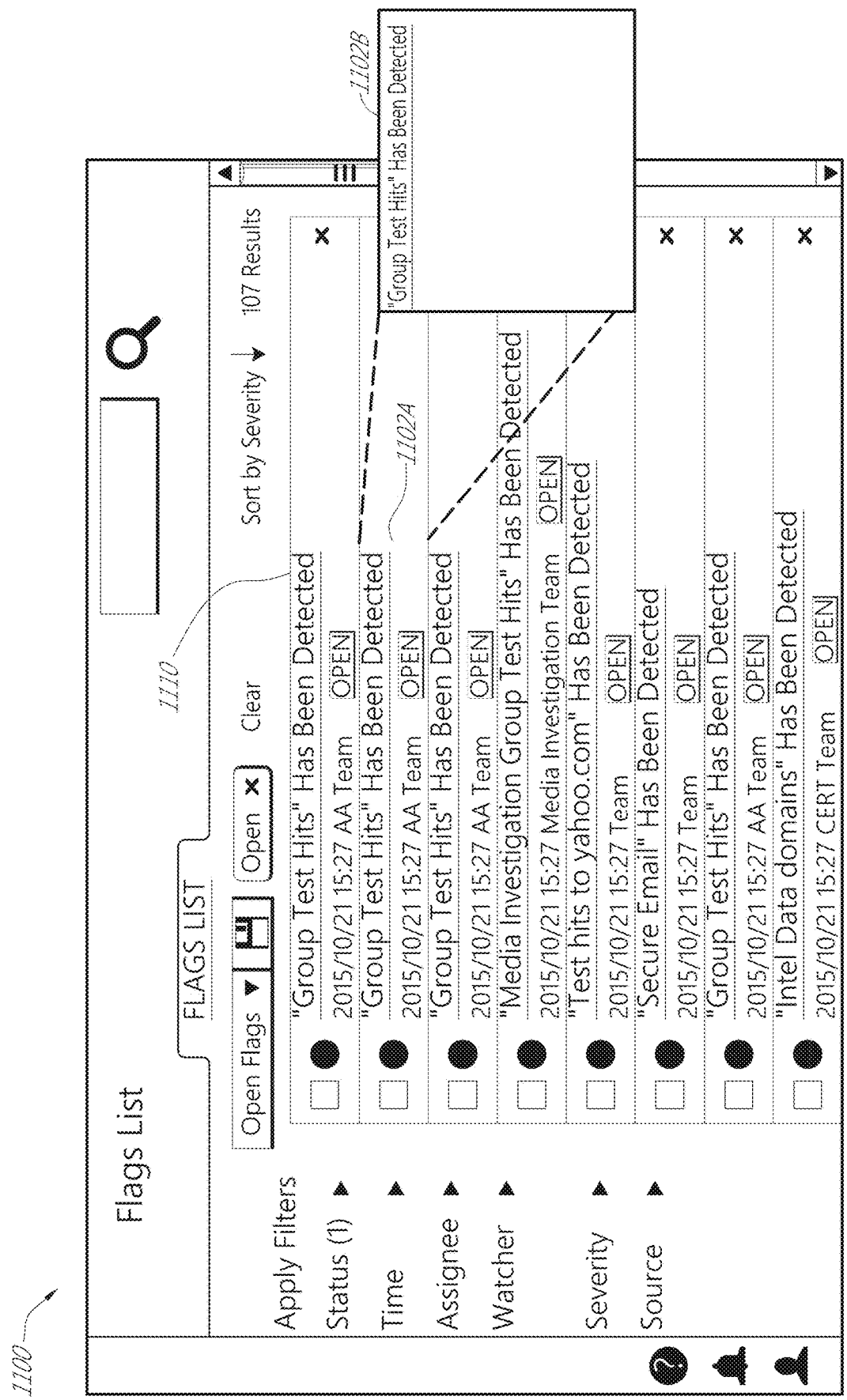

FIG. 11A illustrates a user interface 1100 of the alert system 130 that enables a user to view an alert inbox containing alerts from the search management system 100, according to some embodiments of the present disclosure. In some embodiments, user interface 1100 presents an alert 1102 within alert inbox 1110. In some embodiments, the alert 1102 is cumulative. For example, if a search object causes search results to be found at two discrete times, such as 1 PM and 2 PM, then alert 1102 may represent and enable a user to view both search results cumulatively. For example, by selecting alert 1102A in FIG. 11A, an exploded alert view 1102B, as shown in detail in FIG. 11B, may be presented to the user in the alert inbox 1110 of user interface 1100. A user may then navigate to user interfaces 900 and/or 1000 from user interface 1100 to further investigate the alert. Further, additional information regarding embodiments of results user interface 1100 is found in U.S. patent application Ser. No. 14/579,752. For example, the '752 application describes embodiments of user interface 1100 for an alert system in paragraphs [0215], [0216], and [0224]-[0228], among others.

In some embodiments, user interfaces 900, 1000, and/or 1100 may be configured via the alert system 130 to display search results and/or alerts based on permissions. For example, a search object may be configured to not only particular user, however, the permissions associated with the search object may enable the user to view the search results and/or alerts and user interfaces 900, 1000, and/or 1100 because the user may belong to the permissioned group. A permissioned group may be based on the access control list 300 as described herein with respect to FIG. 3.

Additional Embodiments

Embodiments of the present disclosure relate to a search management system that may automatically search multiple data sources and may be capable of detecting retrospective changes to a data source. For example, data may be backfilled in a data source and the recurrent searches of the search management system may be capable of detecting a matching search result within the backfilled data. The search management system may be able to determine search results in a memory-efficient and/or resource-efficient manner. In some embodiments, the capability to identify search results retrospectively, such as in the case of backfilled data, may occur alternatively or additionally to the processes of avoiding recurrent searches of previously searched data, as described herein.

Additional Example Search Management Systems

Figure 13:
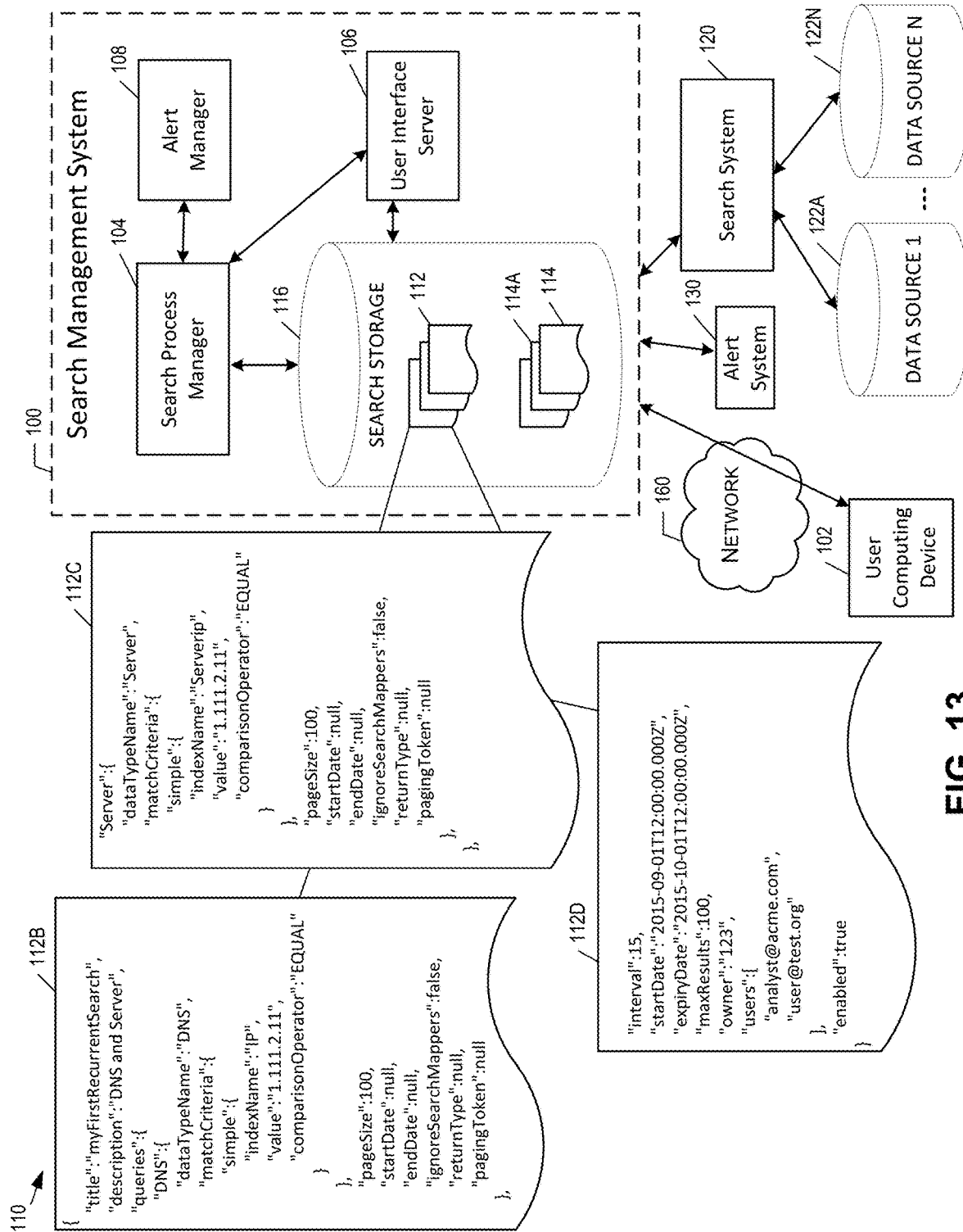
FIG. 13 is a block diagram illustrating another example search management system, according to some embodiments of the present disclosure.

FIG. 13 illustrates a search management system 100, according to some embodiments of the present disclosure. The embodiment of FIG. 13 may be similar to the embodiment of FIG. 1. For example, in the embodiment of FIG. 13, the database environment 110 includes a network 160, a search management system 100, user computing device 102, a search system 120, and an alert system 130. Various communications between these devices are illustrated. For example, user computing device 102 may send user input, such as queries and/or recurrent search schedules, to the search management system 100.

As illustrated, user created recurrent searches may be stored in search storage 116 as search objects 112. For example, the search object 112B-112D may represent various properties of a search object. In the example, the search object 112B-112D may be stored and/or accessed in a JavaScript Object Notation (JSON) data format. The example search object 112B-112D includes one or more "queries." An example query may specify a data source to be queried and one or more matching criteria, which may include one or more comparison operators. For example, various matching criteria may correspond to textual matching, partial textual matching, geographic matching at one or more coordinates and/or within a geographic area, matching using regular expressions, and/or matching using wildcards. The search object 112B-112D may specify: one or more indices of a data source; a frequency; a parameter for the oldest search results to look for; a parameter for when the search should begin; a parameter for when the search should expire ("expiryDate"), such as automatically becoming disabled; a predetermined and/or maximum number of results to return; one or more recipients; an event that may cause a search to run; and/or a permissions group. Search process manager 104 may access the search objects 112 to automatically query the data sources 122 via the search system 120.

As described herein, the search process manager 104 may store the search results 114 from the search system 120 in the search storage 116. For example, for a current search, the search results 114 may be stored and/or serialized to the search storage 116. In some embodiments, the most recent search results 114 may replace previous search results to conserve memory resources. The search process manager 104 may cause presentation of the results in the user interface server 106, and/or distribute results via the alert system 130, each of which is as described in further detail herein. In some embodiments, the user interface server 106 and/or the search management system 100 enables a user the capability of row-by-row deletion of data entries in the data sources 122.

In some embodiments, the search management system 100 enables a user to search using a "tag." A tag may be a data structure identifying multiple related indices from multiple data types and/or data sources. For example, "IP" or "domain name" indices may be found in multiple discrete data types and/or data sources. Thus, a tag for "IP" indices in multiple data types and/or data sources may enable searching of multiple data types and/or data sources at once for the same search term and/or parameter. A recurring search may also be configured with a search object that includes one or more search terms and/or parameters for one or more tags.

Additional Example Search Processes

Figure 14:
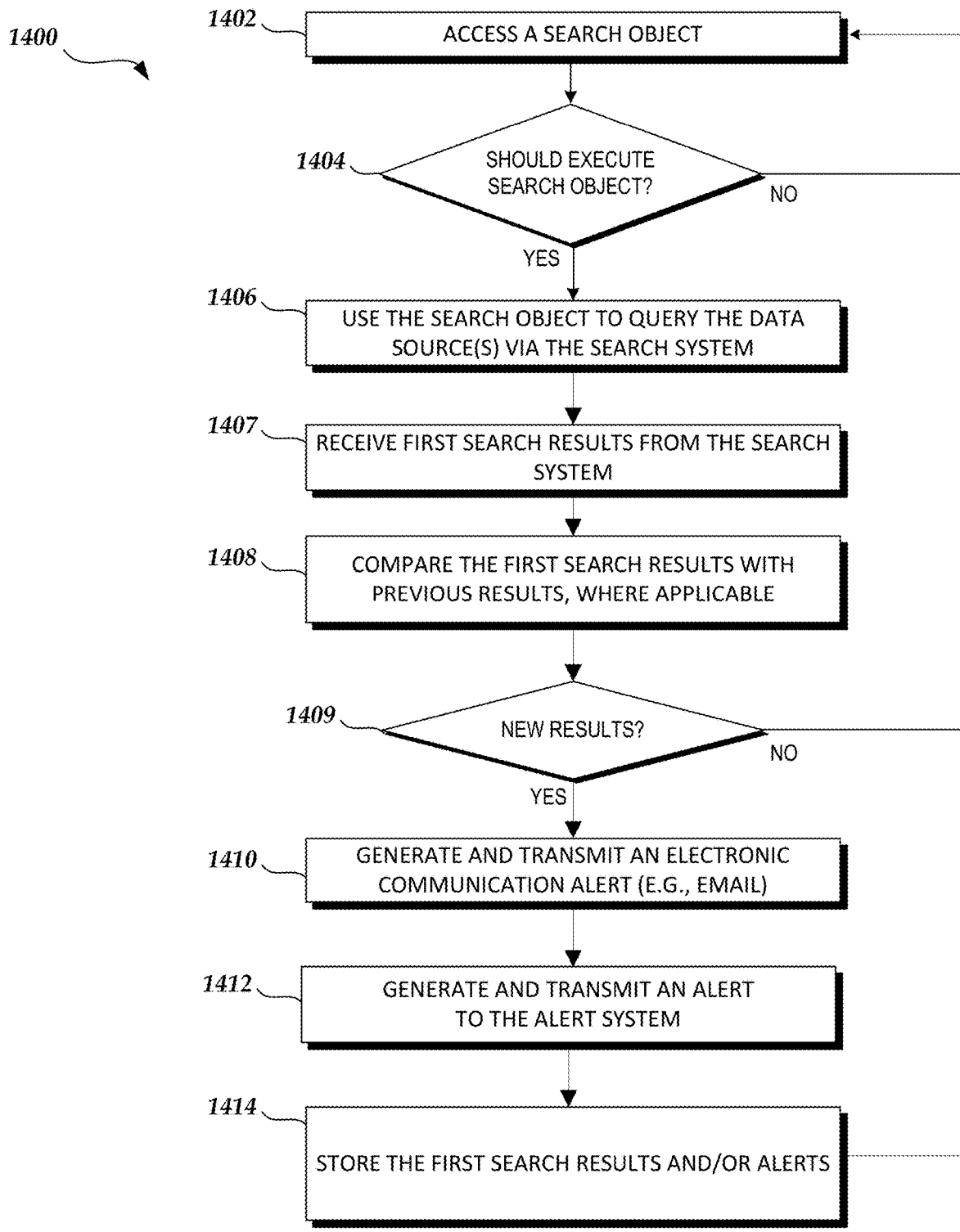
FIG. 14 is a flowchart of another example method of executing recurrent searches, according to some embodiments of the present disclosure.

FIG. 14 is a flowchart of another example method of executing recurrent searches, according to some embodiments of the present disclosure. Although the method is described in conjunction with the systems of FIGS. 1 and/or 13, persons skilled in the art will understand that any system configured to perform the method, in any order, is within the scope of this disclosure. The method 1400 may be performed by the systems 100, 120, or 130 of FIGS. 1 and/or 13, such as the various components of the search management system 100 of FIGS. 1 and/or 13 as discussed herein, including the search process manager 104, the user interface server 106, and/or the alert manager 108. Depending on the embodiment, the method 1400 may include fewer or additional blocks and/or the blocks may be performed in order different than is illustrated.

Beginning at block 1402, the search process manager 104 accesses a search object. A search object may be created and/or edited via the user interface server 106, which is described in greater detail with respect to FIGS. 4-7 and 15-17. The example search object 112A of FIG. 1 and/or the example search object 112B-112D of FIG. 13 may illustrate various properties of a search object. For example, a search object may include a status property that indicates whether the search object is "enabled" or "disabled." The search object may specify: one or more search terms, such as an IP address, domain name, phone number, and/or any other strings; one or more queries; one or more indices of the data source; one or more match criterion; one or more comparators; one more data sources; a frequency, such as a time frequency of thirty minutes or one hour; a parameter for the oldest search results to look for; a parameter for when the search should begin; a parameter for when the search should expire, such as automatically becoming disabled; a predetermined and/or maximum number of results to return; one or more recipients; an event that may cause a search to run; and/or a permissions group. In some embodiments, the search object includes an execution condition that indicates when the search process manager 104 should execute one or more queries of the search object. As described herein, the execution condition may specify a frequency or an event that causes the query execute. As will be described with respect to process 1400, the search process manager 104 may continually poll the search storage 116 to access the search objects on a recurring basis.

At block 1404, the search process manager 104 determines whether to initiate a search based on the accessed search object at block 1402. For example, the search process manager 104 checks the status property and determines to initiate a search based on the search object if the status is "enabled." If the status is "disabled," the search process manager 104 exits the process loop and returns to block 1402 process other search objects and/or this same search object at a later time (for example, the status of the search object may be changed from "disabled" to "enabled.") The search process manager 104 may also determine whether to initiate a search from the search object based on a current timestamp, the start and/or expiration dates of the search object, the frequency the search object, an event, and/or a last execution timestamp associated with the search object. In one example, the example search object contains a frequency property for recurrent searches every fifteen minutes and there is an associated last execution timestamp of 2015-10-21 12:45:13 GMT. The search process manager 104 accesses the current timestamp. If the current timestamp is 2015-10-09 12:50:30 GMT (and the start and expiration dates are 2015-09-01 00:00:00 and 2015-10-01 00:00:00, respectively), then the search process manager 104 does not initiate a search because the fifteen minute periodic time has not elapsed and the search process manager 104 exits the loop and returns to block 202. However, if the current timestamp is 2015-10-21 13:01:10 GMT, then the search process manager 104 determines that a search should be initiated and proceeds to the next block. As described herein, the search process manager 104 may evaluate an execution condition of the search object to determine whether to initiate a search. For example, initiating a search after receiving and/or determining an event has occurred, which is described in further detail with respect to block 204 of FIG. 2.

At block 1406, the search process manager 104 uses the search object to query the one or more data sources via the search system. In some embodiments, the search system 120 includes an Application Programming Interface to receive the one or search terms, the one or more data sources, and other inputs. As discussed herein, the one or more data sources may include electronic logs. The search system 120 may search the entire data sources, such as electronic logs, for the one or more search terms. Additionally or alternatively to block 206 of FIG. 2, block 1406 may identify search results that precede the last execution timestamp. For example, by retrieving all matching results regardless of a time property associated with data in the data sources, data may be back filled into the data source and the search process manager 104 may identify new search results even though the data source may contain entries with timestamps before the last execution timestamp, but that were inserted into the data source after the most recent search execution and/or out of order. Accordingly, previously found search results could be included in the present search results from the current periodic search. In some embodiments, a configurable threshold of maximum and/or predefined results may be used by the search process manager 104 and/or system 120. For example, the maximum number of results may be set to 100. In the example, the search system 120 may query the data sources for the first 100 matching results. Alternatively, the search system 120 may retrieve all matching results and the maximum number of results may be determined at a later block, such as block 1407, as described herein. Searching by the search process manager 104 and/or the search system 120 may include textual, partial textual searching, geographic searching, searching using regular expressions, and/or searching using wildcards. For example, if the search string is "www.evil.com," the search system 120 may search the one or more data sources for entries that match "www.evil.com" or a partial match such as "evil. com." Additional information regarding searching via indexes and other techniques is described in the '240 patent, e.g., see Col. 15 l. 41-Col. 22 l. 34 or in the '882 application, e.g., see paragraphs [0058]-[0135].

At block 1407, the search process manager 104 receives the search results from the search system 120. In FIG. 14, the "first search results" at blocks 1407, 1408, and 1414 may refer to the current search results. The example search result 114A of FIG. 1 and/or FIG. 13 may illustrate various properties of a search result. In some embodiments, the properties of a search result may be customized for a particular data type and/or data source. For example, as illustrated, example search result 114A includes properties such as the data source, computer name, IP address, and a timestamp from the respective electronic log and/or data source. Other example properties for search results include a person's name and/or identifier, a malware name and/or identifier, or any other property that may be associated with an electronic log. In some embodiments, since the search system 120 may identify results from any time period, the example search result 114A may be identified from a current search (such as a search occurring on 2015-10-25), even though the example search result 114A has a timestamp that precedes the current time (such as a timestamp of 2015-10-21 13:13:56 GMT). Moreover, in some embodiments, the particular data entry corresponding to the example search result 114A may have been backfilled to the data source (such as the data being added on 2015-10-24), and the current search (such as occurring on 2015-10-25) may identify a new search result corresponding to the recently added data. In the example, the backfilled data entry, which corresponds to the search result 114A, may predate a previous search (such as a previous search occurring on 2015-10-23, for example); however, since subsequent searches can search retrospectively and can detect new data entries regardless of those new entries' timestamps, the backfilled data entry may be detected in the current search. As discussed herein, the search process manager 104 may limit the number of results to a predetermined maximum number of results. For example, the maximum number of results may be limited to a configurable number of 100, 1000, 10000, or 100000 results. Accordingly, example process 1400 may efficiently determine a sliding window of a predefined number of results based on each time the search process manager 104 initiates a new search.

At block 1408, the search process manager 104 compares the current search results with previous search results, where applicable. For example, the search results may be in a data object format. Example data object formats include Java or C# data objects. As described herein, previous search results may be accessed in a data object format. Accordingly, the search process manager 104 may compare the current search results and the previous search results. An example comparison may be a Set comparison, such as a Java Set comparison operation. If this is the first time that a recurrent search detects results than no comparison is necessary and the current search results would be new results and the search process manager 104 would proceed to block 1410. As described herein, in some embodiments the search results may be serialized and/or stored in a serialized data format in the search storage 116. Accordingly, the previous search results may be deserialized from the search storage 116 into data objects for comparison in block 1408.

At block 1409, based on the comparison at block 1408, the search process manager 104 determines if there any new results and/or any change in results. For example, the comparison at block 1408, such as a Set comparison, determines that there any new data objects in the current search results as compared to the previous search results. If there are no new search results, the search process manager 104 returns to block 1402. Returning to block 1402 after block 1409 may efficiently process the search results because blocks 1410, 1412, and/or 1414 may be skipped, which may conserve resources and/or reduce processor usage. If there are new search results, the search process manager 104 proceeds to block 1410.

At block 1410, the alert manager 108 generates and transmits an electronic communication alert. For example, an email alert may be transmitted to one or more email addresses corresponding to particular users and/or list serves. In some embodiments, the email alert contains information identifying the particular search object for which search results were found. Additionally or alternatively, the email alert includes the search results and/or excerpts from the data source(s) corresponding to the search results. Additional information regarding electronic communication alerts are described in further detail with respect to FIG. 8. Other example electronic communication alerts include chat message notifications and/or text message alerts.

At block 1412, the alert manager 108 and/or alert system 130 generates and transmits an alert to the alert system 130. For example, the alert may include the search results and/or other information associated with the respective search object for the search result. The alert system 130 may include user interfaces for presenting the alert information. Additional information regarding alerts, user interfaces, and the alert system 120 are described in further detail with respect to FIGS. 9-11. Further, additional information regarding alerts, user interfaces, and the alert system 120 is found in U.S. patent application Ser. No. 14/579,752. For example, the '752 application describes example user interfaces for an alert system in paragraphs [0214]-[0228], among others. As another example, the alert system 130 and/or the search management system 100 may perform the clustering methods and techniques described in paragraphs [0149]-[0160], among others, of the '752 application. For example, the alert system 130 may use the search result and/or properties from the search result (such as computer name, user name, IP address, etc.) as a seed for clustering, which is described in further detail in the '752 application. In some embodiments, the alert system 130 may be capable of sending electronic communication alerts.

At block 1414, the alert manager 108 stores the search results and/or alerts in the search storage 116. For example, the current search results may be stored in the search storage 116. An example method for storing search results that are in a data object format may be serializing the objects and storing the serialized objects in the search storage 116. In some embodiments, the serialized search results may replace the previous search results in the search storage 116 to conserve memory resources in the search storage 116. Accordingly, the next time the current search runs, the search process manager 104 may retrieve the previous results from the search storage 116, at block 1408, such as by converting the serialized results into data objects also known as deserialization. In some embodiments, block 1414 may be executed any time search results are retrieved, thereby storing search results after any run, instead of being stored when there are new results as illustrated in the example method 1400. In some embodiments, search results in the search storage 116 may not be discarded and/or replaced. For example, the search results for each recurrent search may be stored for a period of time. Block 1414 may be similar to block 214 of FIG. 2.

Additional Example Search Management User Interfaces

FIGS. 15-18 illustrate additional example user interfaces of the search management system, according to some embodiments of the present disclosure. In various embodiments, aspects of the user interfaces may be rearranged from what is shown and described below, and/or particular aspects may or may not be included. However, the embodiments described below in reference to FIGS. 15-18 provides example user interfaces of the system.

Figure 15:
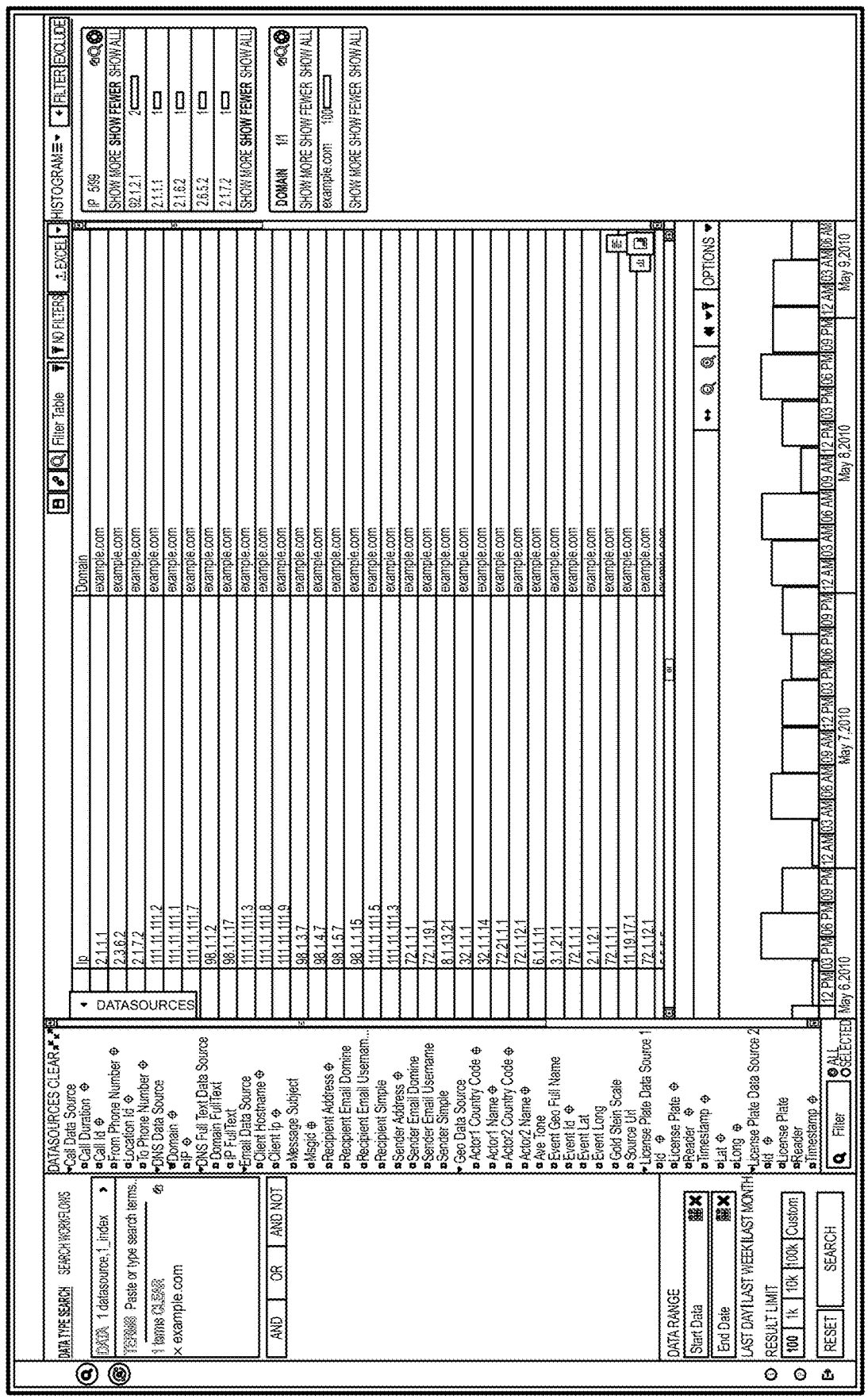

FIG. 15 illustrates an example user interface of the search management system 100 that enables a user to dynamically search one or more data sources and/or to schedule recurrent searches, according to some embodiments of the present disclosure. For example, as illustrated, a user may search for "example.com" in a DNS data source with the "Domain" index selected. The user interface may enable searching of various data sources/indices such as a call data source (e.g., telephone call logs) with indices: call duration, call identifier, phone number, etc.; a DNS data source with indices for domain names and/or IP addresses; an email data source; a geographic data source; a license plate data source with indices for geographic coordinates; and/or other data sources/indices such as those illustrated in FIG. 15. In a geographic context, the user interface may enable searching within a geographic area and/or corresponding to a geographic location. As illustrated, the user interface may dynamically present the search results. Additional information regarding a dynamic search user interface system is described in the '882 application, e.g., see paragraphs [0058]-[0135].

Figure 16:
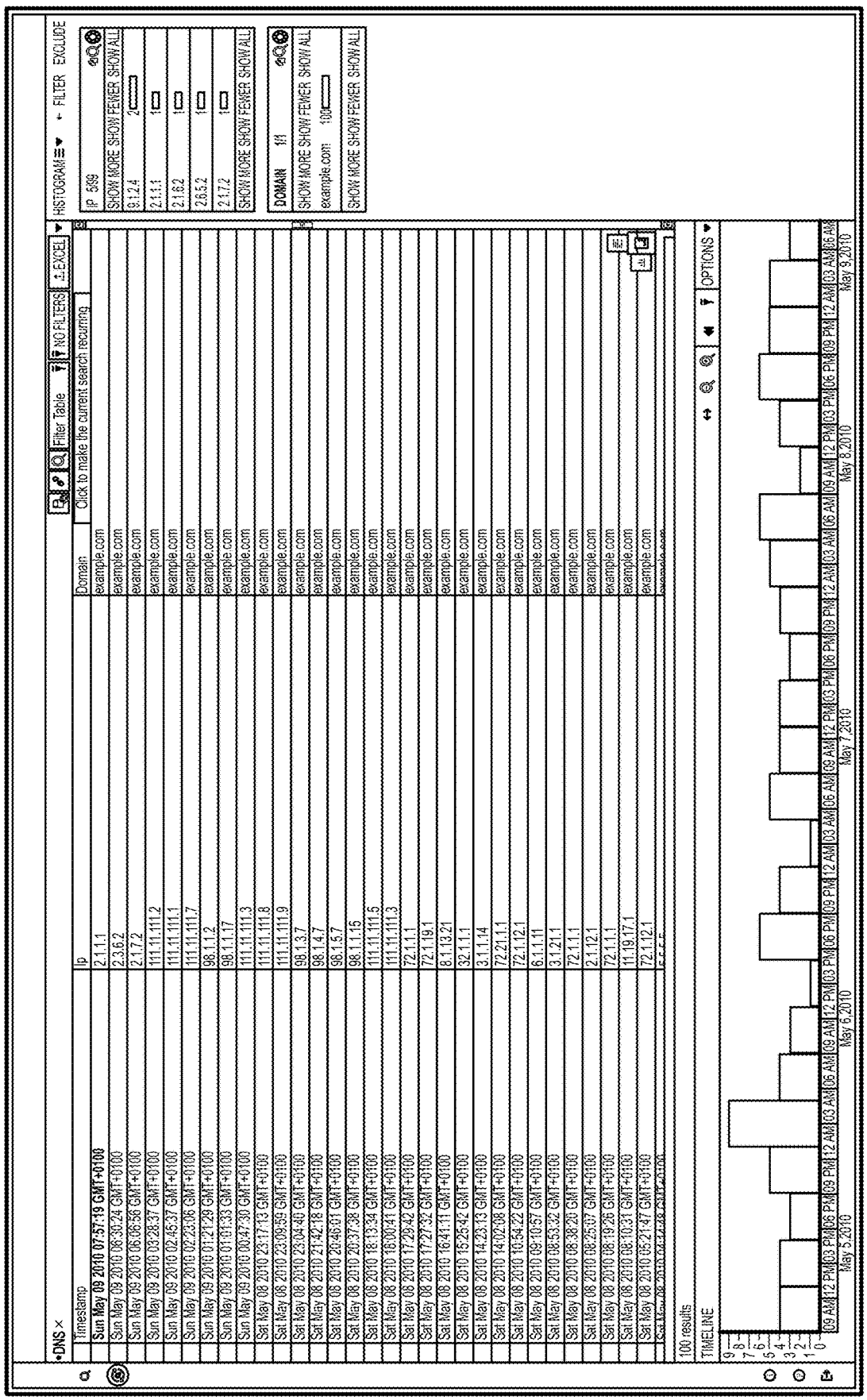

FIG. 16 illustrates another example user interface of the search management system 100. For example, the user interface elements of the user interface of FIG. 16 may be similar to the user interface elements of the user interface of FIG. 15. For example, as illustrated, both user interfaces may enable user to save the current search as a recurring search.

FIG. 17 illustrates another example user interface of the search management system 100 that enables a user to configure and/or create a recurrent search. In some embodiments, a current search need not return any search results for a recurring search to be configured and/or created by a user. The user interface of FIG. 17 may be similar to the user interface of FIG. 6. A user selection to save a current search, as illustrated by the user selection of the "click to make the current search recurring" user interface option in FIG. 16 that may correspond to the current search illustrated in FIGS. 15 and/or 16, may cause the user interface of FIG. 17 to be presented. The example user interface of FIG. 17 has a name input, a descript input, a start date, an expiration date, and/or a recipient list. The user input received from a user interface along with the search criteria specified from FIGS. 15 and/or 16 may be stored in a search object.

FIG. 18 illustrates another example user interface of the search management system 100 that enables a user to manage their recurrent searches. The user interface of FIG. 18 may be similar to the user interface of FIG. 7. The example user interface of FIG. 18 may enable a user to enable, disable, edit, and/or view one or more recurrent searches.

Implementation Mechanisms

The various computing device(s) discussed herein, such as the search management system 100, search process manager 104, alert manager 108, user interface server 106, and/or user computing device 102, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The search management system 100 may be hosted and/or executed on one or more computing devices with one or more hardware processors and with any of the previously mentioned operating system software.

Figure 12:
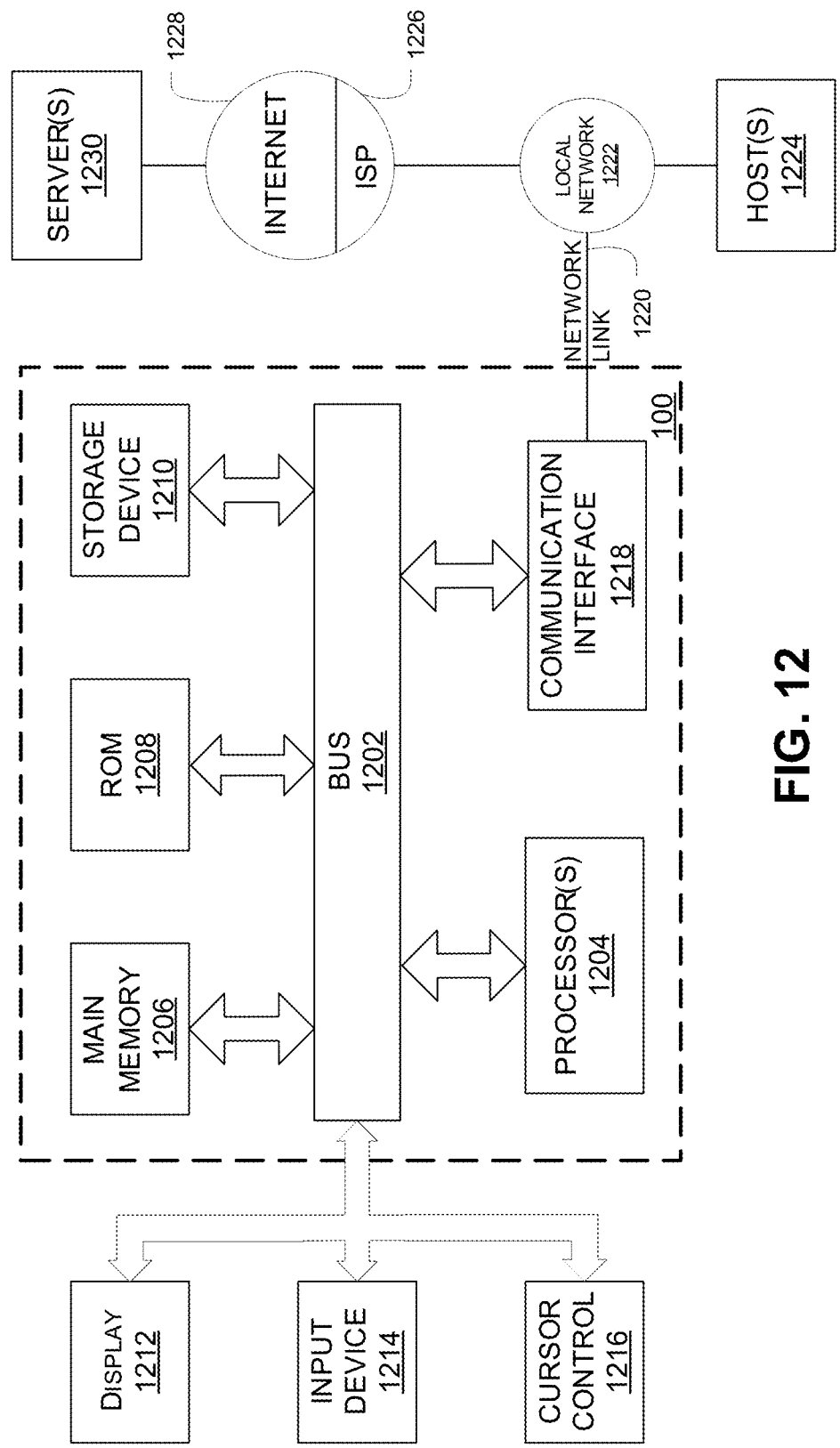
FIG. 12 is a block diagram illustrating an example search management system with which various methods and systems discussed herein may be implemented.

FIG. 12 is a block diagram that illustrates example components of the search management system 100. While FIG. 12 refers to the search management system 100, any of the other computing devices, modules, services, and/or user computing devices discussed herein may have some or all of the same or similar components, such as the search system 120 and/or alert system 130.

The search management system 100 may execute software, e.g., standalone software applications, applications within browsers, network applications, etc., whether by the particular application, the operating system, or otherwise. Any of the systems discussed herein may be performed by the search management system 100 and/or a similar computing system having some or all of the components discussed with reference to FIG. 12.

The search management system 100 includes a bus 1202 or other communication mechanism for communicating information, and a hardware processor, or multiple processors, 1204 coupled with bus 1202 for processing information.

The search management system 100 also includes a main memory 1206, such as a random access memory (RAM), cache and/or other dynamic storage devices, coupled to bus 1202 for storing information and instructions to be executed by processor(s) 1204. Main memory 1206 also may be used for storing temporary variables or other intermediate information during execution of instructions to be executed by processor(s) 1204. Such instructions, when stored in storage media accessible to processor(s) 1204, render the search management system 100 into a special-purpose machine that is customized to perform the operations specified in the instructions. Such instructions, as executed by hardware processors, may implement the methods and systems described herein for scheduling recurrent searches from multiple data sources and/or for providing the search results to one or more users.

The search management system 100 further includes a read only memory (ROM) 1208 or other static storage device coupled to bus 1202 for storing static information and instructions for processor(s) 1204. A storage device 1210, such as a magnetic disk, optical disk, or USB thumb drive (Flash drive), etc., is provided and coupled to bus 1202 for storing information and instructions. The search process manager 104 and/or the alert manager 108 of FIG. 1 may be stored on the main memory 1206 and/or the storage device 1210.

In some embodiments, each of the search storage 116 and/or the data sources 122 of FIG. 1 may correspond to a distributed database management system such as, but not limited to, Apache Cassandra, an Elastisearch system, a file system, relational database such as, but not limited to, MySql, Oracle, Sybase, or DB2, and/or a distributed in memory caching system such as, but not limited to, Memcache, Memcached, or Java Caching System.

The search management system 100 and/or user computing device 102 may be coupled via bus 1202 to a display 1212, such as a cathode ray tube (CRT) or LCD display or touch screen, for displaying information to a computer user. An input device 1214 is coupled to bus 1002 for communicating information and command selections to processor 1204. One type of input device 1214 is a keyboard including alphanumeric and other keys. Another type of input device 1214 is a touch screen. Another type of user input device is cursor control 1216, such as a mouse, a trackball, a touch screen, or cursor direction keys for communicating direction information and command selections to processor 1204 and for controlling cursor movement on display 1212. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The search management system 100 may include a presentation module to implement a GUI, for example, FIGS. 4-7 and/or 9-11, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The search management system 100, or components of it, such as the search process manager 104, the alert manager 108, user interface server 106 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor(s) 1204 for execution. For example, the instructions may initially be carried on a magnetic disk or solid state drive of a remote computer. The remote computer may load the instructions into its dynamic memory and send the instructions over a telephone or cable line using a modem. A modem local to the search management system 100 may receive the data on the telephone or cable line and use an infra-red transmitter to convert the data to an infra-red signal. An infra-red detector can receive the data carried in the infra-red signal and appropriate circuitry can place the data on bus 1202. Bus 1202 carries the data to main memory 1206, from which the processor(s) 1204 retrieves and executes the instructions. The instructions received by main memory 1206 may retrieve and execute the instructions. The instructions received by main memory 1206 may optionally be stored on storage device 1210 either before or after execution by processor(s) 1204.

The search management system 100 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to be communicated with a WAN). Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from the search management system 100, are example forms of transmission media.

A network, such as the network 160 of FIG. 1, may comprise, but is not limited to, one or more local area networks, wide area network, wireless local area network, wireless wide area network, the Internet, or any combination thereof.

The search management system 100 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor(s) 1204 as it is received, and/or stored in storage device 1210, or other non-volatile storage for later execution.

In some embodiments, the search management system 100 may operate in a distributed computing environment including several computer systems that are interconnected using one or more computer networks. The search management system 100 could also operate within a computing environment having a fewer or greater number of devices than are illustrated in FIG. 1 and/or FIG. 12. Thus, the depiction of search management system 100 in FIG. 1 and/or FIG. 12 should be taken as illustrative and not limiting to the present disclosure. For example, the search management system 100 could implement various Web services components and/or peer-to-peer network configurations to implement at least a portion of the processes described herein. For example, multiple servers and/or processes may schedule queries, query data sources, and/or generate alerts in a distributed manner to expedite the querying of data sources.

It will be appreciated that while the present disclosure typically discusses searching of malware and/or proxy logs, the systems and methods described herein may be agnostic to the types of data being searched and/or may search any type of data source, such as, credit card logs, phone logs, etc., for example.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method comprising:
receiving user input from a first user indicating a recurrent search and an execution condition for the recurrent search, the user input further comprising a first indication of a first data source and a permissions group;
storing a search object comprising (i) information regarding the recurrent search, (ii) the first indication of the first data source, and (iii) the permissions group, the search object further indicating a recipient;
querying at least the first data source to determine a first plurality of search results based at least in part on the search object, the first data source comprising an electronic log comprising network data;
storing the first plurality of search results;
determining to initiate the recurrent search of at least the first data source based at least in part on the execution condition being satisfied;
querying at least the first data source to determine a second plurality of search results;
comparing the first plurality of search results to the second plurality of search results;
determining a new search result, wherein the new search result is present in the second plurality of search results and not present in the first plurality of search results;
transmitting, to the recipient, an electronic communication associated with the new search result;
determining that a second user belongs to the permissions group; and
presenting, in a user interface, at least some of the second plurality of search results to the second user.

2. The method of claim 1, wherein determining to initiate the recurrent search of at least the first data source based at least in part on the execution condition being satisfied further comprises:
determining a first query time associated with the first plurality of search results; and
determining that a difference between a current time and the first query time satisfies the execution condition based at least in part on a search frequency.

3. The method of claim 1, wherein querying at least the first data source to determine the second plurality of search results further comprises:
accessing the search object, the search object further comprising one or more search terms, wherein the one or more search terms is a parameter for querying at least the first data source.

4. The method of claim 1, wherein querying at least the first data source to determine the second plurality of search results further comprises:
querying a second data source to determine at least some of the second plurality of search results.

5. The method of claim 4, further comprising:
retrieving the search object, the search object further comprising a second data source identifier corresponding to the second data source.

6. The method of claim 1, further comprising:
serializing the first plurality of search results to first data, wherein storing the first plurality of search results comprises storing the first data in a non-transitory computer storage medium;
retrieving the first data from the non-transitory computer storage medium; and deserializing the first data to a first plurality of objects, wherein comparing the first plurality of search results to the second plurality of search results further comprises comparing the first plurality of objects to a second plurality of objects corresponding to the second plurality of search results.

7. A non-transitory computer storage medium storing computer executable instructions that when executed by a computer hardware processor perform operations comprising:
receiving user input from a first user indicating a recurrent search and an execution condition for the recurrent search, the user input further comprising a first indication of a first data source and a permissions group;
storing a search object comprising (i) information regarding the recurrent search, (ii) the first indication of the first data source, and (iii) the permissions group, the search object further indicating a recipient;
determining to initiate the recurrent search of at least the first data source based at least in part on the execution condition being satisfied;
retrieving a first plurality of search results;
querying at least the first data source to determine a second plurality of search results based at least in part on the search object, the first data source comprising an electronic log comprising network data;
comparing the first plurality of search results to the second plurality of search results;
determining a new search result, wherein the new search result is present in the second plurality of search results and not present in the first plurality of search results;
transmitting, to the recipient, an electronic communication associated with the new search result;
determining that a second user belongs to the permissions group; and
presenting, in a user interface, at least some of the second plurality of search results to the second user.

8. The non-transitory computer storage medium of claim 7, wherein determining to initiate the recurrent search of at least the first data source based at least in part on the execution condition being satisfied further comprises:
determining a first query time associated with the first plurality of search results; and
determining that a difference between a current time and the first query time satisfies the execution condition based at least in part on a search frequency.

9. The non-transitory computer storage medium of claim 7, wherein querying at least the first data source to determine the second plurality of search results further comprises:
retrieving the search object, the search object comprising one or more search terms, wherein the one or more search terms is a parameter for querying at least the first data source.

10. The non-transitory computer storage medium of claim 7, wherein querying at least the first data source to determine the second plurality of search results further comprises:
querying a second data source to determine at least some of the second plurality of search results.

11. The non-transitory computer storage medium of claim 7, wherein the operations further comprise:
serializing the first plurality of search results to first data; and
storing the first data, wherein retrieving the first plurality of search results further comprises retrieving the first data.

12. The non-transitory computer storage medium of claim 11, wherein the operations further comprise:

deserializing the first data to a first plurality of objects, wherein comparing the first plurality of search results to the second plurality of search results further comprises comparing the first plurality of objects to a second plurality of objects corresponding to the second plurality of search results.

13. A system comprising:

a non-transitory computer storage medium configured to store a first plurality of search results; and one or more computer hardware processors configured to execute code instructions to:

receive user input from a first user indicating a recurrent search and an execution condition for the recurrent search, the user input further comprising a first indication of a first data source and a permissions group;

store a search object comprising (i) information regarding the recurrent search, (ii) the first indication of the first data source, and (iii) the permissions group, the search object further indicating a recipient;

determine to initiate the recurrent search of at least the first data source based at least in part on the execution condition being satisfied;

retrieve a first plurality of search results;

query at least the first data source to determine a second plurality of search results based at least in part on the search object, the first data source comprising an electronic log comprising network data;

compare the first plurality of search results to the second plurality of search results;

determine a new search result, wherein the new search result is present in the second plurality of search results and not present in the first plurality of search results;

transmit, to the recipient, an electronic communication associated with the new search result;

determine that a second user belongs to the permissions group; and present, in a user interface, at least some of the second plurality of search results to the second user.

14. The system of claim 13, wherein determining to initiate the recurrent search of at least the first data source based at least in part on the execution condition being satisfied further comprises:

determining a first query time associated with the first plurality of search results; and determining that a difference between a current time and the first query time satisfies the execution condition based at least in part on a search frequency.

15. The system of claim 13, wherein querying at least the first data source to determine the second plurality of search results further comprises:

retrieving the search object, the search object comprising one or more search terms, wherein the one or more search terms is a parameter for querying at least the first data source.

16. The system of claim 13, wherein querying at least the first data source to determine the second plurality of search results further comprises:

querying a second data source to determine at least some of the second plurality of search results.

17. The system of claim 13, wherein the one or more computer hardware processors are further configured to execute code instructions to:

serialize the second plurality of search results to second data; and store, in the non-transitory computer storage medium, the second data.

18. The system of claim 13, wherein the one or more computer hardware processors are further configured to execute code instructions to:

replace, in the non-transitory computer storage medium, the first plurality of search results with the second plurality of search results.

* * * * *